(12) United States Patent
Liu et al.

(10) Patent No.: US 12,193,093 B2
(45) Date of Patent: Jan. 7, 2025

(54) MINIMIZATION OF DRIVE TEST FOR MULTI RADIO ACCESS TECHNOLOGY DUAL CONNECTIVITY

(71) Applicant: Qualcomm Incorporated, San Diego, CA (US)

(72) Inventors: Huichun Liu, Beijing (CN); Peng Cheng, Beijing (CN); Xipeng Zhu, San Diego, CA (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/425,555

(22) PCT Filed: Jan. 22, 2020

(86) PCT No.: PCT/CN2020/073731
§ 371 (c)(1),
(2) Date: Jul. 23, 2021

(87) PCT Pub. No.: WO2020/151737
PCT Pub. Date: Jul. 30, 2020

(65) Prior Publication Data
US 2022/0167447 A1   May 26, 2022

(30) Foreign Application Priority Data

Jan. 24, 2019   (WO) ................ PCT/CN2019/072925

(51) Int. Cl.
*H04W 72/04*   (2023.01)
*H04L 43/065*   (2022.01)
(Continued)

(52) U.S. Cl.
CPC ............ *H04W 76/16* (2018.02); *H04L 43/065* (2013.01); *H04W 24/08* (2013.01); *H04W 48/16* (2013.01); *H04W 74/002* (2013.01)

(58) Field of Classification Search
CPC ..... H04W 76/16; H04W 24/08; H04W 24/10; H04W 48/16; H04W 48/18; H04W 74/008; H04W 8/24; H04W 92/10; H04L 43/065
See application file for complete search history.

(56) References Cited

U.S. PATENT DOCUMENTS

| | | | |
|---|---|---|---|
| 2013/0072182 A1* | 3/2013 | Jung ..................... | H04W 24/10 455/422.1 |
| 2013/0084809 A1* | 4/2013 | Johansson ............. | H04W 76/19 455/67.11 |

(Continued)

FOREIGN PATENT DOCUMENTS

| | | |
|---|---|---|
| CN | 106817696 A | 6/2017 |
| CN | 107690162 A | 2/2018 |

(Continued)

OTHER PUBLICATIONS

NTT Docomo Inc, et al., "Re-Configurability of Logged MDT Measurements", 3GPP TSG-RAN2#70, R2-102906_MDT Reconfiguration, 3rd Generation Partnership Project, Mobile Competence Centre, 650, Route Des Lucioles, F-06921 Sophia-Antipolis Cedex, France, vol. RAN WG2, No. Montreal, Canada, May 10, 2010-May 14, 2010, 5 Pages, May 4, 2010, XP050423187, [retrieved on May 4, 2010], Model 3 of pp. 3-5.

(Continued)

*Primary Examiner* — Mahbubul Bar Chowdhury
(74) *Attorney, Agent, or Firm* — Holland & Hart LLP/Qualcomm

(57) ABSTRACT

Methods, systems, and devices for wireless communication are described. Generally, the described techniques provide (Continued)

for efficiently collecting and reporting minimization of drive test (MDT) measurements for one or more radio access technology (RAT) types and/or for multiple base stations in a dual connectivity deployment. In one example, a user equipment (UE) may receive an MDT measurement configuration indicating a first RAT type for collecting measurements and a second RAT type for reporting measurements. In this example, the UE may use the measurement configuration to collect MDT measurements for the first RAT type, and the UE may report the MDT measurements to a base station associated with the second RAT. Further techniques for efficiently collecting and reporting MDT measurements in a dual connectivity deployment are also described herein.

23 Claims, 17 Drawing Sheets

(51) Int. Cl.
*H04W 24/08* (2009.01)
*H04W 48/16* (2009.01)
*H04W 74/00* (2009.01)
*H04W 76/16* (2018.01)

(56) References Cited

U.S. PATENT DOCUMENTS

| | | | | |
|---|---|---|---|---|
| 2013/0178224 A1* | 7/2013 | Chang | H04W 24/10 | 455/452.1 |
| 2013/0189970 A1* | 7/2013 | Fukuta | H04W 4/029 | 455/422.1 |
| 2014/0119224 A1* | 5/2014 | Keskitalo | H04W 88/06 | 370/252 |
| 2014/0128057 A1* | 5/2014 | Siomina | H04W 56/00 | 455/423 |
| 2014/0192775 A1 | 7/2014 | Li et al. | | |
| 2014/0228016 A1* | 8/2014 | Futaki | H04W 36/0058 | 455/422.1 |
| 2014/0295847 A1* | 10/2014 | Futaki | H04W 36/0058 | 455/436 |
| 2015/0201338 A1* | 7/2015 | Gopal | H04W 24/08 | 370/252 |
| 2015/0289141 A1* | 10/2015 | Ghasemzadeh | H04W 72/0446 | 370/330 |
| 2016/0057643 A1 | 2/2016 | Fukuta et al. | | |
| 2017/0156060 A1 | 6/2017 | Wu | | |
| 2017/0208491 A1 | 7/2017 | Xu et al. | | |
| 2019/0182729 A1* | 6/2019 | Lu | H04W 24/10 | |
| 2019/0357095 A1* | 11/2019 | Pakniat | H04W 36/0061 | |
| 2021/0204158 A1* | 7/2021 | Kimba Dit Adamou | H04L 1/0026 | |
| 2021/0329445 A1* | 10/2021 | Zhang | H04W 76/15 | |

FOREIGN PATENT DOCUMENTS

| | | |
|---|---|---|
| EP | 2621115 A1 | 7/2013 |
| EP | 2763454 A1 | 8/2014 |
| EP | 3039799 A1 | 7/2016 |
| EP | 3057354 A1 | 8/2016 |
| WO | WO-2015115825 A1 | 8/2015 |
| WO | WO-2016012053 A1 | 1/2016 |
| WO | WO-2016161787 A1 | 10/2016 |

OTHER PUBLICATIONS

Supplementary Partial European Search Report—EP20744588—Search Authority—Munich—Oct. 6, 2022 (191165EP).
International Search Report and Written Opinion—PCT/CN2019/072925—ISA/EPO—Jun. 28, 2019 (191165WO1).
International Search Report and Written Opinion—PCT/CN2020/073731—ISA/EPO—Apr. 22, 2020 (191165WO2).
Huawei: "TP to 38.413 for Support of Trace and MDT for NG-RAN in R1-15", 3GPP TSG-RAN WG3 Meeting #98, R3-174561, 3rd Generation Partnership Project (3GPP), Mobile Competence Centre, 650, Route Des Lucioles, F-06921 Sophia-Antipolis Cedex, France, vol. RAN WG3, No. Reno, Nevada, USA, Nov. 27, 2017-Dec. 1, 2017, 8 Pages, Nov. 18, 2017, XP051373390, p. 1.
NTT Docomo, et al., "User Consent Indication for MDT in S1AP", 3GPP TSG-RAN WG3 Meeting #71, 36413_CR0 849_ (REL—10)_R3-110797_USERCONSENT—S1AP, 3rd Generation Partnership Project (3GPP), Mobile Competence Centre, 650, Route Des Lucioles, F-06921 Sophia-Antipolis Cedex, France, vol. RAN WG3, No. Taipei, Taiwan, Feb. 21, 2011-Feb. 25, 2011, 24 Pages, Feb. 15, 2011 (Feb. 15, 2011), XP050497541, p. 1.
Qualcomm Incorporated: "SCG Change Failure in EN-DC", 3GPP TSG-RAN WG2 Meeting #100, R2-1713899, 3rd Generation Partnership Project, Mobile Competence Centre, 650, Route Des Lucioles, F-06921 Sophia-Antipolis Cedex, France, vol. RAN WG2, Reno, USA, Nov. 27, 2017-Dec. 1, 2017, 3 Pages, Nov. 17, 2017, XP051372534, the whole document.
Supplementary European Search Report—EP20744588—Search Authority—Munich—Jan. 5, 2023 (191165EP).

* cited by examiner

MINIMIZATION OF DRIVE TEST FOR MULTI RADIO ACCESS TECHNOLOGY DUAL CONNECTIVITY

CROSS REFERENCE TO RELATED APPLICATIONS

The present Application for Patent claims priority to International Patent Application No. PCT/CN2020/073731 by LIU et al., entitled "MINIMIZATION OF DRIVE TEST FOR MULTI RADIO ACCESS TECHNOLOGY DUAL CONNECTIVITY," filed Jan. 22, 2020; and to International Patent Application No. PCT/CN2019/072925 by LIU et at, entitled "MINIMIZATION OF DRIVE TEST FOR MULTI RADIO ACCESS TECHNOLOGY DUAL CONNECTIVITY," filed Jan. 24, 2019, each of which is assigned to the assignee hereof, and each of which is expressly incorporated by reference in its entirety herein.

BACKGROUND

The following relates generally to wireless communications, and more specifically to minimization of drive test (MDT) for multi radio access technology (RAT) dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to collect and report MDT measurements to allow wireless operators to identify the quality of communications in certain locations. Conventional techniques for collecting and reporting MDT measurements in some scenarios may be deficient.

SUMMARY

The described techniques relate to improved methods, systems, devices, and apparatuses that support minimization of drive test (MDT) for multi radio access technology (RAT) dual connectivity. Generally, the described techniques provide for efficiently collecting and reporting MDT measurements for one or more RATs and/or for multiple base stations in a dual connectivity deployment. In one example, a user equipment (UE) may receive an MDT measurement configuration including one or more fields indicating a common RAT type for collecting and reporting MDT measurements. In this example, the common RAT type may correspond to multiple RATs, and the UE may collect MDT measurements for the multiple RATs based on the one or more fields indicating the common RAT type. The UE may then report the MDT measurements via one of the multiple RATs based on the one or more fields indicating the common RAT type. For example, the UE may transmit the MDT measurement report for each RAT to a base station associated with the RAT, or the UE may combine the MDT measurements for the multiple RATs and transmit a single MDT measurement report for the multiple RATs. In some cases, the MDT measurement configuration may indicate a first RAT type for collecting measurements and a second RAT type for reporting measurements (e.g., where the first RAT type and the second RAT type may be different or the same). Further techniques for efficiently collecting and reporting MDT measurements in a dual connectivity deployment are also described herein.

A method for wireless communication ata UE is described. The method may include receiving a measurement configuration for collecting and reporting MDT measurements, identifying one or more fields in the measurement configuration that indicate at least one of a RAT type for collecting the MDT measurements and a RAT type for reporting the MDT measurements, collecting the MDT measurements in accordance with the one or more fields within the measurement configuration, and transmitting one or more reports including information indicative of the MDT measurements in accordance with the one or more fields within the measurement configuration.

An apparatus for wireless communication at a UE is described. The apparatus may include a processor, memory coupled with the processor, and instructions stored in the memory. The instructions may be executable by the processor to cause the apparatus to receive a measurement configuration for collecting and reporting MDT measurements, identify one or more fields in the measurement configuration that indicate at least one of a RAT type for collecting the MDT measurements and a RAT type for reporting the MDT measurements, collect the MDT measurements in accordance with the one or more fields within the measurement configuration, and transmit one or more reports including information indicative of the MDT measurements in accordance with the one or more fields within the measurement confilzuration.

Another apparatus for wireless communication at a UE is described. The apparatus may include means for receiving a measurement configuration for collecting and reporting MDT measurements, identifying one or more fields in the measurement configuration that indicate at least one of a RAT type for collecting the MDT measurements and a RAT type for reporting the MDT measurements, collecting the MDT measurements in accordance with the one or more fields within the measurement configuration, and transmitting one or more reports including information indicative of the MDT measurements in accordance with the one or more fields within the measurement configuration.

A non-transitory computer-readable medium storing code for wireless communication at a UE is described. The code may include instructions executable by a processor to receive a measurement configuration for collecting and reporting MDT measurements, identify one or more fields in the measurement configuration that indicate at least one of a RAT type for collecting the MDT measurements and a RAT type for reporting the MDT measurements, collect the MDT measurements in accordance with the one or more fields within the measurement configuration, and transmit one or more reports including information indicative of the MDT measurements in accordance with the one or more fields within the measurement configuration.

Some examples of the method, apparatuses, and non-transitory computer-readable medium described herein may further include operations, features, means, or instructions for determining that the one or more fields within the measurement configuration indicate a common RAT type for collecting or reporting the MDT measurements, where the common RAT type includes measurement configurations for multiple RAT types. In some examples of the method, apparatuses, and non-transitory computer-readable medium described herein, the common RAT type includes a next generation radio access network (NGRAN). Some examples of the method, apparatuses, and non-transitory computer-readable mediwn described herein may further include operations, features, means, or instructions for determining that the one or more fields within the measurement configuration indicate a specific RAT type for collecting or reporting the MDT measurements.

Some examples of the method, apparatuses, and non-transitory computer-readable medium described herein may further include operations, features, means, or instructions for identifying that the UE may be operating in a dual-connectivity deployment with a first base station associated with a first RAT and a second base station associated with a second RAT, determining that the one or more fields within the measurement configuration indicate a common RAT type for collecting or reporting the MDT measurements, where the common RAT type indicates that the measurement configuration may be to be used for collecting or reporting measurements for the first RAT and the second RAT, and collecting and reporting the MDT measurements for the first RAT and the second RAT based on the measurement configuration.

In some examples of the method, apparatuses, and non-transitory computer-readable medium described herein, the first base station may be a master node and the second base station may be a secondary node. In some examples of the method, apparatuses, and non-transitory computer-readable medium described herein, the first RAT or the second RAT includes New Radio (NR), Long Term Evolution (UE), LTE licensed assisted access (LAA), or NR unlicensed (NR-U). Some examples of the method, apparatuses, and non-transitory computer-readable medium described herein may further include operations, features, means, or instructions for identifying an indication in a measurement configuration of whether the measurement configuration applies when the UE may be configured to operate in a dual-connectivity mode, where transmitting the one or more reports includes indicating, in the one or more reports, whether the MDT measurements were collected in a dual-connectivity mode.

In some examples of the method, apparatuses, and non-transitory computer-readable medium described herein, collecting the MDT measurements in accordance with the one or more fields within the measurement configuration may include operations, features, means, or instructions for collecting a first set of MDT measurements for a first RAT, or a second set of MDT measurements for a second RAT, or both based on the one or more fields within the measurement configuration. Some examples of the method, apparatuses, and non-transitory computer-readable medium described herein may further include operations, features, means, or instructions for connecting to a base station associated with a first RAT, and transmitting a report including MDT measurements associated with a second RAT to the base station associated with the first RAT.

In some examples of the method, apparatuses, and non-transitory computer-readable medium described herein, the measurement configuration includes a logged MDT measurement configuration, and the one or more reports include logged measurement reports. In some examples of the method, apparatuses, and non-transitory computer-readable medium described herein, the measurement configuration includes an immediate MDT measurement configuration, and the one or more reports include immediate measurement reports.

A method for wireless communication at a base station is described. The method may include identifying at least one of a RAT type for a UE to use to collect MDT measurements and a RAT type for the UE to use to report the MDT measurements, generating a measurement configuration including one or more fields that indicate the at least one of a RAT type for collecting the MDT measurements and the RAT type for reporting the MDT measurements, transmitting the measurement configuration, and receiving one or more reports including information indicative of the MDT measurements in accordance with the measurement configuration.

An apparatus for wireless communication at a base station is described. The apparatus may include a processor, memory coupled with the processor, and instructions stored in the memory. The instructions may be executable by the processor to cause the apparatus to identify at least one of a RAT type for a UE to use to collect MDT measurements and a RAT type for the UE to use to report the MDT measurements, generate a measurement configuration including one or more fields that indicate the at least one of a RAT type for collecting the MDT measurements and the RAT type for reporting the MDT measurements, transmit the measurement configuration, and receive one or more reports including information indicative of the MDT measurements in accordance with the measurement configuration.

Another apparatus for wireless communication at a base station is described. The apparatus may include means for identifying at least one of a RAT type for a UE to use to collect MDT measurements and a RAT type for the UE to use to report the MDT measurements, generating a measurement configuration including one or more fields that indicate the at least one of a RAT type for collecting the MDT measurements and the RAT type for reporting the MDT measurements, transmitting the measurement configuration, and receiving one or more reports including information indicative of the MDT measurements in accordance with the measurement configuration.

A non-transitory computer-readable medium storing code for wireless communication at a base station is described. The code may include instructions executable by a processor to identify at least one of a RAT type for a UE to use to collect MDT measurements and a RAT type for the UE to use to report the MDT measurements, generate a measurement configuration including one or more fields that indicate the at least one of a RAT type for collecting the MDT measurements and the RAT type for reporting the MDT measurements, transmit the measurement configuration, and receive one or more reports including information indicative of the MDT measurements in accordance with the measurement configuration.

In some examples of the mehod, apparatuses, and non-transitory computer-readable medium described herein, the identifying may include operations, features, means, or instructions for identifying a common RAT type for the UE to use to collect or report the MDT measurements, where the common RAT type includes measurement configurations for multiple RAT types. In some examples of the method, apparatuses, and non-transitory computer-readable medium described herein, the common RAT type includes a NGRAN. In some examples of the method, apparatuses, and non-transitory computer-readable medium described herein, the identifying may include operations, features, means, or instructions for identifying a specific RAT type for the UE to use to collect or report the MDT measurements.

In some examples of the method, apparatuses, and non-transitory computer-readable medium described herein, the base station may be associated with a first RAT, and where receiving the one or more reports including intbrmation indicative of the MDT measurements may include operations, features, means, or instructions for receiving a report including MDT measurements associated with a second RAT, Some examples of the method, apparatuses, and non-transitory computer-readable medium described herein may further include operations, features, means, or instructions for transmitting an indication in the measurement configuration of whether the measurement configuration applies when the UE may be configured to operate in a dual-connectivity mode, where receiving the one or more reports includes, and receiving, in the one or more reports, an indication of whether the MDT measurements were collected in a dual-connectivity mode.

In some examples of the method, apparatuses, and non-transitory computer-readable medium described herein, the measurement configuration includes a logged MDT measurement configuration, and the one or more reports include logged measurement reports. In some examples of the method, apparatuses, and non-transitory computer-readable medium described herein, the measurement configuration includes an immediate MDT measurement configuration, and the one or more reports include immediate measurement reports.

A method for wireless communication at a UE is described. The method may include identifying that the UE is operating in a dual-connectivity deployment with a first base station and a second base station, where the second base station includes a non-standalone base station, transmitting an indication of whether MDT measurements are supported by the UE for the non-standalone base station, and collecting and reporting MDT measurements based on whether MDT measurements are supported by the UE for the non-standalone base station.

An apparatus for wireless communication at a UE is described. The apparatus may include a processor, memory coupled with the processor, and instructions stored in the memory. The instructions may be executable by the processor to cause the apparatus to identity that the UE is operating in a dual-connectivity deployment with a first base station and a second base station, where the second base station includes a non-standalone base station, transmit an indication of whether MDT measurements are supported by the UE for the non-standalone base station, and collect and report MDT measurements based on whether MDT measurements are supported by the UE for the non-standalone base station.

Another apparatus for wireless communication at a UE is described. The apparatus may include means for identifying that the UE is operating in a dual-connectivity deployment with a first base station and a second base station, where the second base station includes a non-standalone base station, transmitting an indication of whether MDT measurements are supported by the UE for the non-standalone base station, and collecting and reporting MDT measurements based on whether MDT measurements are supported by the UE for the non-standalone base station.

A non-transitory computer-readable medium storing code for wireless communication at a UE is described. The code may include instructions executable by a processor to identify that the UE is operating in a dual-connectivity deployment with a first base station and a second base station, where the second base station includes a non-standalone base station, transmit an indication of whether MDT measurements are supported by the UE for the non-standalone base station, and collect and report MDT measurements based on whether MDT measurements are supported by the UE for the non-standalone base station.

In some examples of the method, apparatuses, and non-transitory computer-readable medium described herein, the indication may include operations, features, means, or instructions for transmitting, to the first base station, the first indication of whether MDT measurements may be supported by the UE for the non-standalone base station, and transmitting, to the first base station, a second indication of whether MDT measurements may be supported by the UE for the first base station.

In some examples of the method, apparatuses, and non-transitory computer-readable medium described herein, collecting and reporting MDT measurements may include operations, features, means, or instructions for collecting MDT measurements for the non-standalone base station, and reporting the MDT measurements to the first base station. In some examples of the method, apparatuses, and non-transitory computer-readable medium described herein, the first indication and the second indication may be transmitted in a two-hit MDT availability indication. In some examples of the method, apparatuses, and non-transitory computer-readable medium described herein, the first indication and the second indication may be transmitted separately.

In some examples of the method, apparatuses, and non-transitory computer-readable medium described herein, transmitting the indication may include operations, features, means, or instructions for transmitting, in a transparent container to the first base station, the indication of whether MDT measurements may be supported by the UE for the non-standalone base station. In some examples of the method, apparatuses, and non-transitory computer-readable medium described herein, collecting and reporting MDT measurements may include operations, features, means, or instructions for collecting MDT measurements for the non-standalone base station, and reporting the MDT measurements to the first base station.

In some examples of the method, apparatuses, and non-transitory computer-readable medium described herein, transmitting the indication may include operations, features, means, or instructions for transmitting, to a standalone base station associated with a same RAT as the non-standalone base station, the indication of whether MDT measurements may be supported by the UE for the non-standalone base station. In some examples of the method, apparatuses, and non-transitory computer-readable medium described herein, collecting and reporting MDT measurements may include operations, features, means, or instructions for collecting MDT measurements for the non-standalone base station, and reporting the MDT measurements to the standalone base station.

Some examples of the method, apparatuses, and non-transitory computer-readable medium described herein may further include operations, features, means, or instructions for receiving a measurement configuration for collecting and reporting MDT measurements, the measurement configuration indicating a RAT type with a restriction to non-standalone base stations, standalone base stations, or both, and collecting and reporting MDT measurements for the RAT type based on the restriction. Some examples of the method, apparatuses, and non-transitory computer-readable medium described herein may further include operations, features, means, or instructions for determining that the second base station includes a non-standalone base station based on failing to receive a system information block (SIB) broadcast from the second base station. In some examples of the method, apparatuses, and non-transitory computer-readable medium described herein, the MDT measurements include logged MDT measurements.

A method for wireless communication at a base station is described. The method may include identifying that the base station is a master node and that a non-standalone base station is a secondary node for a UE operating in a dual-connectivity deployment, receiving an indication of whether MDT measurements are supported by the UE for the non-standalone base station, and receiving the MDT measurements based on whether the MDT measurements are supported by the UE for the non-standalone base station.

An apparatus for wireless communication at a base station is described. The apparatus may include a processor, memory coupled with the processor, and instructions stored in the memory. The instructions may be executable by the processor to cause the apparatus to identify that the base station is a master node and that a non-standalone base station is a secondary node for a UE operating in a dual-connectivity deployment, receive an indication of whether MDT measurements are supported by the UE for the non-standalone base station, and receive the MDT measurements based on whether the MDT measurements are supported by the UE for the non-standalone base station.

Another apparatus for wireless communication at a base station is described. The apparatus may include means for identifying that the base station is a master node and that a non-standalone base station is a secondary node for a UE operating in a dual-connectivity deployment, receiving an indication of whether MDT measurements are supported by the UE for the non-standalone base station, and receiving the MDT measurements based on whether the MDT measurements are supported by the UE for the non-standalone base station.

A non-transitory computer-readable medium storing code for wireless communication at a base station is described. The code may include instructions executable by a processor to identify that the base station is a master node and that a non-standalone base station is a secondary node for a UE operating in a dual-connectivity deployment, receive an indication of whether MDT measurements are supported by the UE for the non-standalone base station, and receive the MDT measurements based on whether the MDT measurements are supported by the UE for the non-standalone base station.

In some examples of the method, apparatuses, and non-transitory computer-readable medium described herein, the indication may include operations, features, means, or instructions for receiving, from the UE, the first indication of whether the MDT measurements may be supported by the UE for the non-standalone base station, and receiving, from the UE, a second indication of whether the MDT measurements may be supported by the UE for the base station. In some examples of the method, apparatuses, and non-transitory computer-readable medium described herein, receiving the MDT measurements may include operations, features, means, or instructions for receiving the MDT measurements for the non-standalone base station from the UE.

In some examples of the method, apparatuses, and non-transitory computer-readable medium described herein, the first indication and the second indication may be received in a two-bit MDT availability indication. In some examples of the method, apparatuses, and non-transitory computer-readable medium described herein, the first indication and the second indication may be received separately. In some examples of the method, apparatuses, and non-transitory-computer-readable medium described herein, receiving the indication may include operations, features, means, or instructions for receiving, in a transparent container from the UE, the indication of whether the MDT measurements may be supported by the UE for the non-standalone base station.

In some examples of the method, apparatuses, and non-transitory computer-readable medium described herein, receiving the MDT measurements may include operations, features, means, or instructions for receiving the MDT measurements for the non-standalone base station from the UE. Some examples of the method, apparatuses, and non-transitory computer-readable medium described herein may further include operations, features, means, or instructions for transmitting a measurement configuration to be used by the UE for collecting and reporting the MDT measurements, the measurement configuration indicating a RAT type with a restriction to non-standalone base stations, standalone base stations, or both, and receiving the MDT measurements fix the RAT type based on the restriction. In some examples of the method, apparatuses, and non-transitory computer-readable medium described herein, the MDT measurements include logged MDT measurements.

A method for wireless communication ata UE is described. The method may include identifying that the UE is configured to operate in a dual-connectivity deployment with a first base station and a second base station, determining that the UE failed to connect to the first base station, the second base station, or both, generating one or more accessibility reports, where the generating of the one or more accessibility reports is triggered by failure of the UE to connect to the first base station, the second base station, or both, and transmitting the one or more accessibility reports indicating that the UE failed to connect to the first base station, the second base station, or both.

An apparatus for wireless cormtunication at a UE is described. The apparatus may include a processor, memory coupled with the processor, and instructions stored in the memory. The instructions may be executable by the processor to cause the apparatus to identify that the UE is configured to operate in a dual-connectivity deployment with a first base station and a second base station, determine that the UE failed to connect to the first base station, the second base station, or both, generate one or more accessibility reports, where the generating of the one or more accessibility reports is triggered by failure of the UE to connect to the first base station, the second base station, or both, and transmit the one or more accessibility reports indicating that the UE, failed to connect to the first base station, the second base station, or both.

Another apparatus for wireless communication at a UE is described. The apparatus may include means for identifying that the UE is configured to operate in a dual-connectivity deployment with a first base station and a second base station, determining that the UE failed to connect to the first base station, the second base station, or both, generating one or more accessibility reports, Where the generating of the one or more accessibility reports is triggered by failure of the UE to connect to the first base station, the second base station, or both, and transmitting the one or more accessibility reports indicating that the UE failed to connect to the first base station, the second base station, or both.

A non-transitory computer-readable medium storing code for wireless communication at a UE is described. The code may include instructions executable by a processor to identify that the UE is configured to operate in a dual-connectivity deployment with a first base station and a second base station, determine that the UE failed to connect to the first base station, the second base station, or both, generate one or more accessibility reports, where the generating of the one or more accessibility reports is triggered by failure of the UE to connect to the first base station, the second base station, or both, and transmit the one or more accessibility reports indicating that the UE failed to connect to the first base station, the second base station, or both.

In some examples of the method, apparatuses, and non-transitory computer-readable medium described herein, determining that the UE failed to connect to the first base station, the second base station, or both may include operations, features, means, or instructions for attempting to gain access to the first base station or the second base station via a random-access procedure, and determining that the random-access procedure failed. In some examples of the method, apparatuses, and non-transitory computer-readable medium described herein, transmitting one or more accessibility reports may include operations, features, means, or instructions for transmitting, to the first base station, a first accessibility report indicating that the UE failed to connect to the first base station, and transmitting, to the second base station, a second accessibility report indicating that the UE failed to connect to the second base station.

In some examples of the method, apparatuses, and non-transitory computer-readable medium described herein, the first accessibility report may be transmitted in a signaling radio bearer 1, and the second accessibility report may be transmitted in a signaling radio bearer 3. In some examples of the method, apparatuses, and non-transitory computer-readable medium described herein, transmitting one or more accessibility reports may include operations, features, means, or instructions for transmitting, to the first base station, an accessibility report indicating that the UE failed to connect to the first base station or that the UE failed to connect to the second base station. In some examples of the method, apparatuses, and non-transitory computer-readable medium described herein, the accessibility report may be transmitted in a signaling radio bearer 1.

Some examples of the method, apparatuses, and non-transitoiy computer-readable medium described herein may further include operations, features, means, or instructions for storing a time stamp of the elapsed time between logging the failed connection to the first base station or the second base station and reporting the log, a global cell identity of the first base station or the second base station, an indication of latest available radio measurements for any frequency or RAT, an indication of latest detailed location information, a number of random access preambles transmitted, an indication of whether the maximum transmission power was used, an indication of a number of attempted beams, an indication of whether contention was detected, an indication of latest wireless local area network measurement results, an indication of latest Bluetooth memurement results, or a combination thereof.

DETAILED DESCRIPTION

Figure 1:
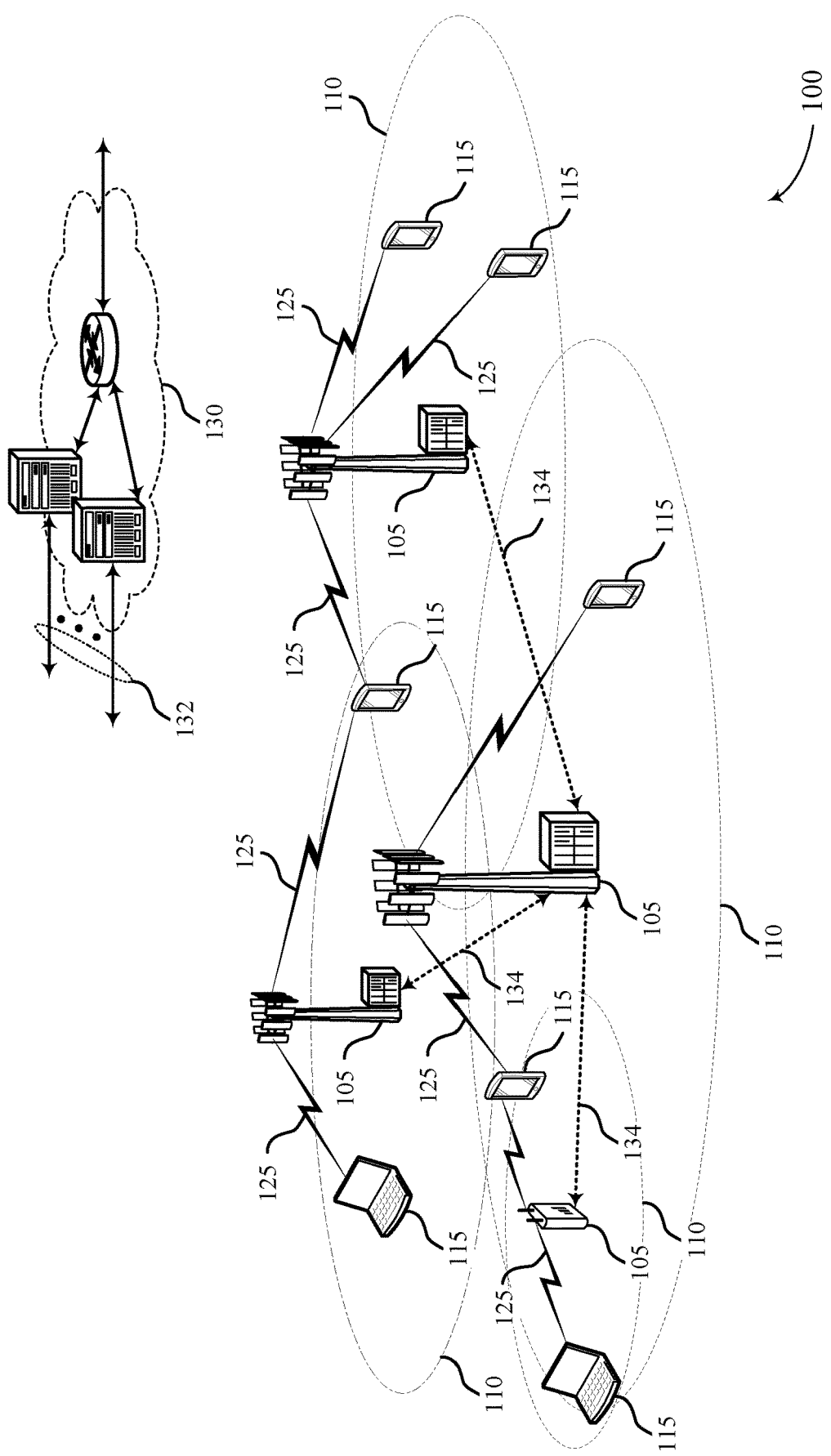
FIGS. 1-4 illustrate examples of wireless communications systems that support minimization of drive test (MDT) for multi radio access technology (RAT) dual connectivity in accordance with aspects of the present disclosure.

In some wireless communications systems, a user equipment (UE) may be configured to collect and report measurements to allow wireless operators to identify the quality of communications in certain locations (e.g., where the UE may be configured to collect and report measurements for a specific area or for a specific amount of time in or around a certain location). That is, wireless operators may use subscriber devices to collect radio measurements. Such measurements may be referred to as minimization of drive test (MDT) measurements. In some cases (e.g., for single connectivity), a UE may be configured to communicate with base stations associated with a specific radio access technology (RAT). In such cases, the UE may receive a measurement configuration from a base station associated with the specific RAT, and the UE may use the measurement configuration to collect and report measurements for the specific RAT. In other cases (e.g., for multi-connectivity), however, a UE may be able to communicate with base stations associated with multiple RATs. Conventional techniques for configuring a UE to perform and report MDT measurements when the UE is able to communicate with base stations associated with the multiple RATs may be deficient.

As described herein, a wireless communications system may support efficient techniques for collecting and reporting MDT measurements for one or more RATs and/or for multiple base stations in a dual connectivity deployment. In one example, a user equipment WE) may receive an MDT measurement configuration including one or more fields indicating a common RAT type for collecting and reporting MDT measurements. In this example, the common RAT type may correspond to multiple RATs, and the UE may collect MDT measurements for the multiple RATs based on the one or more fields indicating the common RAT type. The UE may then report the MDT measurements via one of the multiple RATs based on the one or more fields indicating the common RAT type. Further techniques for efficiently collecting and reporting MDT measurements in a dual connectivity deployment are also described herein.

Particular aspects of the subject matter described herein may be implemented to realize one or more advantages. The described techniques may support improvements in system efficiency such that a device may collect measurements for one RAT and report the measurements via another RAT. This may allow a device to improve reliability of MDT reports, which may result in fewer transmissions and higher system throughput. The device may also perform measurements for multiple RATs using the same configurations, which may simplify the process of collecting and reporting MDT measurements in a wireless communications system.

Aspects of the disclosure introduced above are described below in the context of a wireless communications system. Examples of processes and signaling exchanges that support MDT for multi-RAT dual connectivity are then described. Aspects of the disclosure are further illustrated by and described with reference to apparatus diagrams, system diagrams, and flowtharts that relate to MDT for multi-RAT dual connectivity.

FIG. 1 illustrates an example of a wireless communications system 100 that supports MDT for multi-RAT dual connectivity in accordance with aspects of the present disclosure. The wireless communications system 100 includes base stations 105, UEs 115, and a core network 130. In some examples, the wireless communications system 100 may be a Long-Term Evolution (UE) network, an UE-Advanced (UE-A) network, an UE-A Pro network, an evolved universal terrestrial radio access network (E-UTRAN), or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers, Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (POD), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130), The core network may be an example of an UE core network, a 5G core network (5GC), etc.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia. Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), UE-Unlicensed (LTE-U) RAT, or NR technology in an unlicensed band (e.g, NR unlicensed (NR-U)) such as the 5 GHz industrial, scientific, and medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carders operating in a licensed band (e.g., LAA), Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some wireless communications systems, a UE may be configured to collect and report measurements to allow wireless operators to identify the quality of communications in certain locations. That is, wireless operators may use subscriber devices to collect radio measurements. Such measurements may be referred to as MDT measurements. MDT measurements may include immediate MDT measurements, where a UE 115 in an RRC connected state may collect and report measurements immediately. MDT measurements may also include logged MDT measurements, where a UE 115 in a camped normally state or a cell selection state of an idle mode may collect and log measurements and may report the logged measurements once the UE 115 transitions to a connected state. Further, MDT measurements may include accessibility measurements, where a UE 115 may log failed attempts to establish an RRC connection (e.g., for LTE and UMTS) and may report the logged failed attempts once the UE 115 transitions to a connected state.

In some cases (e.g., for single connectivity), a UE may be configured to communicate with base stations associated with a specific RAT (e.g., LTE). In such cases, the UE may receive a measurement configuration from a base station associated with the specific RAT, and the UE may use the measurement configuration to collect and report measurements for the specific RAT. In other cases (e.g., for multi-connectivity), however, a UTE may be able to communicate with base stations associated with multiple RATs. Conventional techniques for configuring a UE to perform and report MDT measurements for multiple RATs when the UE is able to communicate with base stations associated with the multiple RATs may be deficient. UEs 115 in wireless communications system 100 may support efficient techniques for collecting and reporting MDT measurements for one or more RATs and/or for multiple base stations in a dual connectivity deployment.

Figure 2:
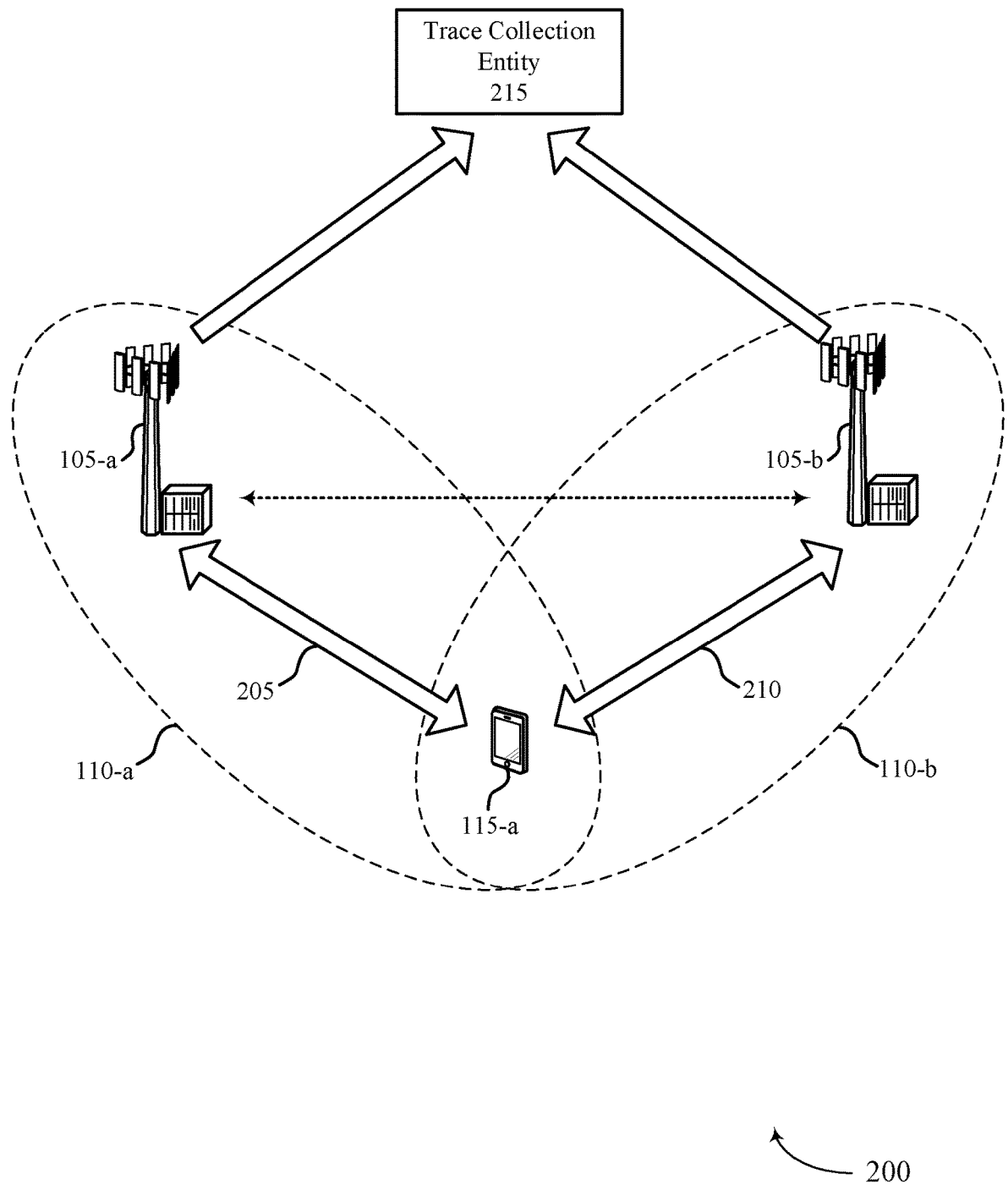

FIG. 2 illustrates an example of a wireless communications system 200 that supports MDT for multi-RAT dual connectivity in accordance with aspects of the present disclosure. Wireless communications system 200 includes UE 115-a, which may be an example of a UE 115 described with reference to FIG. 1, Wireless communications system 200 also includes base station 105-a and base station 105-b, which may be examples of a base station 105 described with reference to FIG. 1. Base station 105-a may be associated with a first RAT and base station 105-b may be associated with a second RAT. For instance, base station 105-a may be an example of an eNB in an LTE network, and base station 105-b may be an example of a gNB in an NR network. Base station 105-a may provide communication coverage for a respective coverage area 110-a, and base station 105-a may provide communication coverage for a respective coverage area 110-b. Base station 105-a may communicate with UE 115-a on resources of one or more carriers 205, and base station 105-b may communicate with UE 115-a on resources of one or more carriers 210.

In the example of FIG. 2, UE 115-a may be in a connected or idle mode and may support communication with base station 105-a associated with one RAT type and base station 105-b associated with another RAT type. Accordingly, it may be appropriate for UE 115-a to collect and report MDT measurements (e.g., immediate or logged MDT measurements) for both RAT types. As described herein, to ensure that UE 115-a is able to identify appropriate configurations for collecting and reporting MDT measurements for different RATs, a base station 105 (e.g., base station 105-a or base station 105-b) may indicate in an MDT configuration a RAT type for collecting MDT measurements and a RAT type for reporting MDT measurements (e.g., in one or more fields in the measurement configuration). Accordingly, a UE 115 may use the MDT measurement configuration for collecting MDT measurements for the RAT type for collecting MDT measurements, and the UE 115 may report the MDT measurements via the RAT type for reporting MDT measurements. Once base station 105-a or base station 105-b receives the MDT measurements, base station 105-a or base station 105-b may transmit the MDT measurements to the trace collection entity 215.

In some cases, the RAT type specified in a measurement configuration for collecting or reporting MDT measurements may be a specific RAT type corresponding to a single RAT type. For instance, a RAT type of LTE may correspond to an LTE network, and a RAT type of NR may correspond to an NR network. Accordingly, when a base station transmits an MDT measurement configuration to UE 115-a with a RAT type of LTE E-UTRAN/5GC), for example, for collecting MDT measurements, UE 115-a may use the measurement configuration for collecting MDT measurements for an LTE network. Similarly, when a base station transmits an MDT measurement configuration to UE 115-a with a RAT type of NR (e.g., NR/5GC), for example, for reporting MDT measurements, UE 115-a may report MDT measurements yia an NR network.

In other cases, the RAT type specified in a measurement configuration for collecting MDT measurements or for reporting MDT measurements may be a common RAT type corresponding to multiple RATs. For instance, a common RAT type of next generation radio access network (NGRAN) may correspond to an LTE network and an NR network. Accordingly, when a base station transmits an MDT measurement configuration to UE 115-a with a RAT type of NG-RAN for collecting MDT measurements, UE 115-a may use the measurement configuration for collecting MDT measurements for an LTE network and an NR network. Similarly, when a base station transmits an MDT measurement configuration to UE 115-a with a RAT type of NG-RAN for reporting MDT measurements, UE 115-a may report MDT measurements for an LTE network or an NR network via the LTE network or the NR network. For instance, UE 115-a may report MDT measurements for the LTE network via the LTE network and the MDT measurements for the NR network via the NR network, or the UE 115-a may couple the MDT measurements for the LTE network and the NR network and report the coupled MDT measurements via the UE network or the NR network. Although the example described above discusses a common RAT type corresponding to LTE and NR, it is to be understood that the common RAT type may correspond to other RAT types including LAA or NR-U.

Using the above techniques for specifying a common RAT in an MDT measurement configuration, an operator may be able to customize a collection of radio measurements for both LTE and NR (e.g., 5G RAT types) to optimize their 5G coverage. Further, when measurement configuration indicates a common RAT for collecting and/or reporting MDT measurements, UE 115-a may collect measurements for one RAT and report the measurements via another RAT (e.g., to a base station associated with the other RAT). Such techniques for MDT reporting may improve the reliability of MDT reports. For instance, UE 115-a may collect MDT measurements for base station 105-a for a first RAT, and UE 115-a may be configured to discard the MDT measurements after 48 hours of not reporting the measurements. Accordingly, if UE 115-a is unable to access base station 105-a or another base station associated with the first RAT within 48 hours, but UE 115-a is able to access base station 105-b or another base station associated with a second RAT, UE 115-a may report the MDT measurements for the first RAT via the second RAT, and the MDT measurements may not be discarded or wasted.

Figure 3:
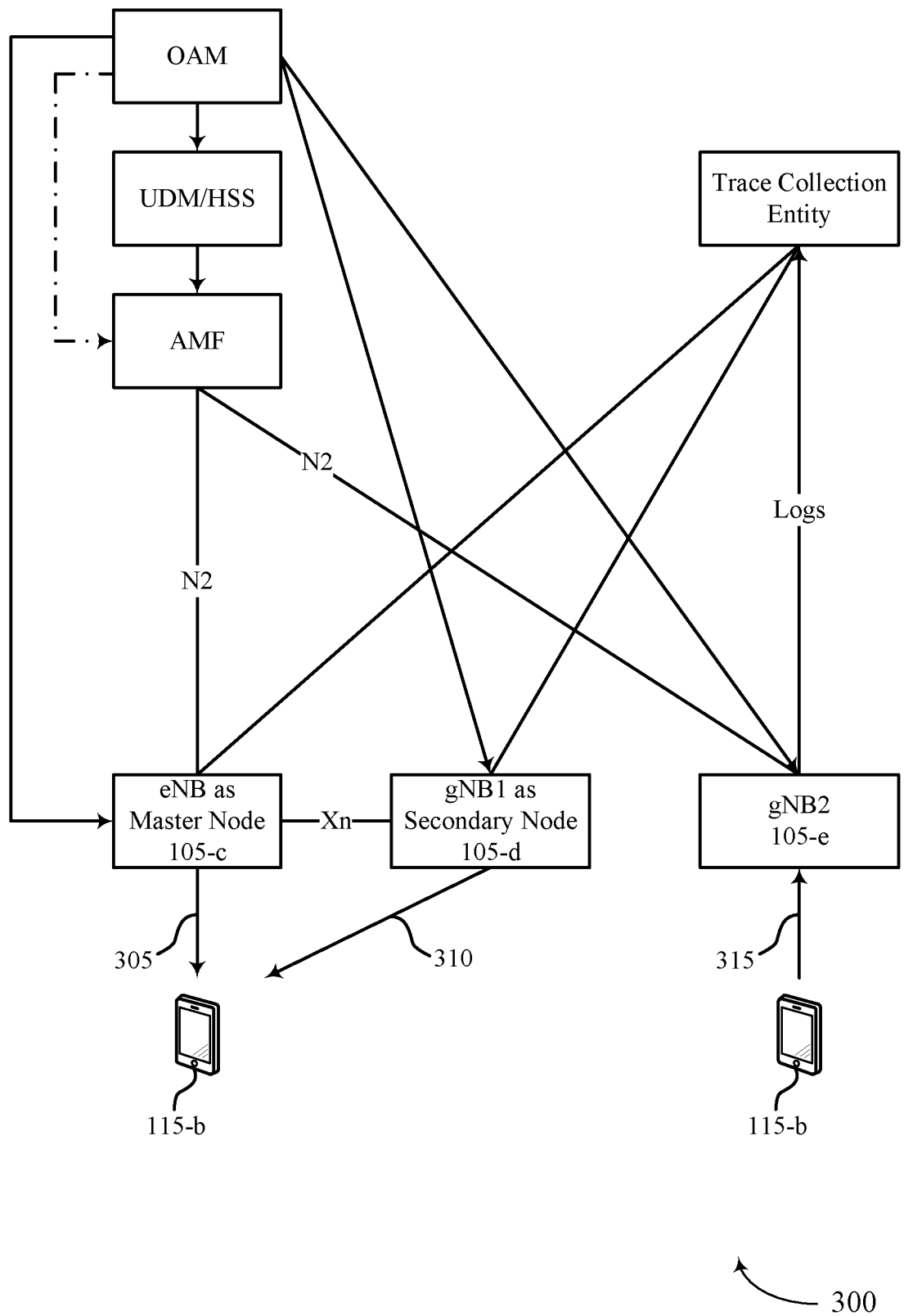

FIG. 3 illustrates an example of a wireless communications system 300 that supports MDT for multi-RAT dual connectivity in accordance with aspects of the present disclosure. In the example of FIG. 3, UE 115-b may be configured to operate in a dual connectivity mode with an eNB 105-c as a master node and a gNB 105-d as a secondary node. In this example, the master node may be associated with a different RAT than the secondary node. Accordingly, it may be appropriate for UE 115-b to collect and report MDT measurements (e.g., immediate or logged MDT measurements) for LTE and NR. As described herein, to ensure that UE 115-a is able to identify appropriate configurations for collecting and reporting MDT measurements for multiple RATS, a base station 105 may indicate in an MDT configuration a RAT type for collecting MDT measurements and a RAT type for reporting MDT measurements. Further, the base station 105 may include a field in an MDT configuration indicating whether the MDT configuration is to be applied by a UE 115 when the UE 115 is in a dual connectivity nactde or when the UE 115 is in a single connectivity mode (i.e., non-dual-connectivity mode).

In some cases, as described with reference to FIG. 2, the RAT type specified in a measurement configuration for collecting MDT measurements or for reporting MDT measurements may be a common RAT type corresponding to multiple RATS. For instance, a common RAT type of NGRAN may correspond to an LTE network (e.g., including the master node eNB 105-c) and an NR network (e.g., including the secondary node gNB 105-d). Accordingly, when UE 115-b receives an MDT measurement configuration with a RAT type of NG-RAN for collecting MDT measurements, UE 115-a may use the measurement configuration for collecting MDT measurements for an LTE network (e.g., based on the master node eNB 105-c) and an NR network (e.g., based on the secondary node gNB 105-d).

Similarly, when a base station transmits an MDT measurement configuration to UE 115-a with a RAT type of NG-RAN for reporting MDT measurements, UE 115-a may report MDT measurements via an LTE network (e.g., via the master node eNB 105-c) or an NR network (e.g., via the secondary node gNB 105-d). In some cases, if a field in the MDT configuration used to collect MDT measurements indicates that the MDT configuration is to be used when UE 115-a is in a dual connectivity mode, UE. 115-a may include a field in an MDT measurement report of the MDT measurements that indicates that the MDT measurements were collected when the UE 115-a was in a dual connectivity mode. Alternatively, if a field in the MDT configuration used to collect MDT measurements indicates that the MDT configuration is to be used when UE 115-a is in a single connectivity mode. UE 115-a may include a field in an MDT measurement report of the MDT measurements that indicates that the MDT measurements were collected when the UE 115-a was in a single connectivity mode.

In the example of FIG. 3, where UE 115-b is configured to operate in a dual connectivity mode. UE 115-b may receive the measurement configuration including the RAT type (e.g., common RAT type) for collecting MDT measurements and the RAT type (e.g., common RAT type) for reporting MDT measurements from the master node eNB 105-c or the secondary node gNB 105-d (e.g., with or without Xn coordination between the master node and the secondary node). In some cases, UE 115-b may be configured to report MDT measurements via NR, and UE 115-b may report the measurement reports (e.g., LTE and/or NR measurement reports) to gNB2 105-e. Such techniques for indicating a RAT type for collecting MDT measurements and a RAT type for reporting MDT measurements may apply to multi-RAT dual connectivity including E-UTRAN NR dual connectivity (EN-DC), next generation EN-DC (NO EN-DC), and NR E-UTRA dual connectivity (NE-DC). Further, the master node and the secondary node may be associated with the same RAT (e.g., NR-NR dual connectivity (NR-NR DC) or different RATs (e.g., EN-DC, NO EN-DC, NE-DC).

Figure 4:
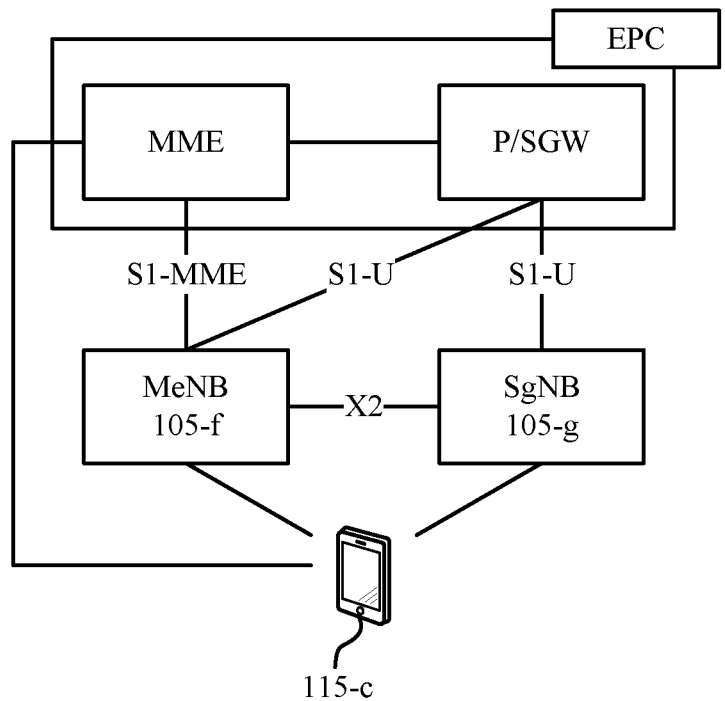

FIG. 4 illustrates an example of a wireless communications system 400 that supports MDT for multi-RAT dual connectivity in accordance with aspects of the present disclosure. In the example of FIG. 4, UE 115-c may be configured to operate in a dual connectivity mode with an MeNB 105-*f* as a master node and an SgNB 105-*g* as a secondary node, where the SgNB 105-*g* is a non-standalone only base station or cell (e.g., the SgNB provides radio resources for UE 115-*c* in a non-standalone mode). The non-standalone only base station may correspond to an NR cell that only supports work as a secondary node of EN-DC connecting to an EPC and may not support connection to a 5GC. In this example, it may be appropriate for UE 115-*c* to indicate whether MDT measurements (e.g., logged MDT measurements) are supported for the non-standalone only base station such that UE 115-*c* may be configured appropriately for collecting and reporting MDT measurements.

In one aspect, UE 115-*c* may transmit a first indication to MeNB 105-*f* (e.g., to a master node) of whether MDT measurements are supported for SgNB 105-*g* (i.e., the non-standalone base station), and the UE 115-*c* may also transmit a second indication to MeNB 105-*f* of whether MDT measurements are supported for MeNB 105-*f.* In some cases, UE 115-*c* may transmit the first indication and the second indication in a two-bit MDT availability indication (e.g., one bit indicating whether MDT measurements are supported for SgNB 105-*g* and another bit indicating whether MDT measurements are supported for MeNB 105-*f*). In other cases, UE 115-*c* may transmit the first indication and the second indication separately (e.g., the first indication of whether MDT measurements are supported for SgNB 105-*g* may be transmitted in an additional NR logged measurement availability indication). UE 115-*c* may then collect MDT measurements for SgNB (e.g., if MDT measurements for SgNB are supported), and UE 115-*c* may report the MDT measurements to MeNB 105-*f.* MeNB 105-*f* may then determine whether to retrieve the MDT measurements from UE 115-*c* based on the indication of whether MDT measurements for SgNB are supported.

In another aspect, UE 115-*c* may transmit an indication, in a transparent container to MeNB 105-*f*, of whether MDT measurements are supported for SgNB 105-*g* (i.e., the non-standalone base station). Since UE 115-*c* may use the transparent container, UE 115-*c* may not differentiate the indication of whether MDT measurements are supported for SgNB 105-*g* from an indication of whether MDT measurements are supported for MeNB 105-*f.* UE 115-*c* may then collect MDT measurements for SgNB 105-*g* (e.g., if MDT measurements for SgNB 105-*g* are supported), and UE 115-*c* may report the MDT measurements to MeNB 105-*f.* MeNB 105-*f* may then determine whether to retrieve the MDT measurements from UE 115-*c* based on the indication in the transparent container of whether MDT measurements for SgNB are supported.

In yet another aspect, UE 115-*c* may transmit an indication, to a standalone base station associated with the same RAT as SgNB 105-*g* (i.e., the non-standalone base station), of whether MDT measurements are supported for SgNB 105-*g*. In this aspect, the MDT measurements fix SgNB 105-*g* may be reported to the standalone base station. UE 115-*c* may then collect MDT measurements for SgNB 105-*g* (e.g., if MDT measurements for SgNB 105-*g* are supported), and UE 115-*c* may report the MDT measurements to the standalone base station. The standalone base station may then determine whether to retrieve the MDT measurements from UE 115-*c* based on the indication of whether MDT measurements for SgNB are supported.

In some cases, when UE 115-*c* is configured to operate in a dual connectivity mode, either the master node or the secondary node (e.g., MeNB and SgNB in an EN-DC deployment) may configure UE 115-*c* for non-standalone only MDT measurements. In other cases, when UE 115-*c* is connected to a single base station (e.g., single connectivity), the base station may configure UE 115-*c* for non-standalone only MDT measurements. UE 115-*c* may determine that the SgNB is a non-standalone base station based on failing to receive a system information block (SIB) 1 broadcast from the SgNB.

An operator may leverage logged measurements received for a non-standalone only base station to collect information indicative of the cell radio environment of non-standalone only base stations (e.g., when the operator utilizes EN-DC deployments with a non-standalone gNB and standalone deployments with a standalone gNB). In some examples, the measurement configuration for the MDT measurements may indicate a RAT type (e.g., as described with reference to FIGS. 2 and 3) and a restriction to non-standalone only base stations, standalone-only base stations, or non-standalone and standalone base stations. In such examples, UE 115-*c* may collect and report measurements for non-standalone only base stations, standalone-only base stations, or non-standalone and standalone base stations associated with the indicated RAT type based on the restriction in the measurement configuration.

The techniques described above with reference to FIGS. 2-4 are directed to collecting and reporting immediate or logged measurements (e.g., by a UE 115 supporting multi-RAT communications or a UE 115 operating in a dual connectivity mode). In some cases, however, a UE 115 may fail to connect to a base station when the UE 115 is configured to operate in a dual connectivity mode. In such cases, it may be appropriate for the UE 115 to report failed attempts at connecting to the base station to the network (e.g., to be forwarded to a trace collection entity).

As described herein, a UE 115 may support efficient techniques for logging failed attempts at connecting to a base station and transmitting accessibility reports to the network including the logs of the failed attempts at connecting to the base station. For instance, the UE 115 may log failed attempts at establishing RRC connections with a master node or a secondary node in a dual-connectivity mode. In some cases, the UE 115 may log failed attempts at establishing RRC connections without prior configuration by the network. The trigger for creating a log of a failed attempt to access a master node may be the expiration of a timer (e.g., when a T300 timer expires during a random-access procedure due to the failed completion of the random-access procedure) for LTE (e.g., E-UTRAN/5GC) and NR. Similarly, the trigger for creating a log of a failed attempt to access a secondary node may be the expiration of a timer (e.g., when a T304 timer expires during a random-access procedure due to the failed completion of the random-access procedure (e.g., for a special cell (SpCell))).

In some cases, a base station 105 may indicate, in an MDT configuration or some other configuration, a RAT type for accessibility reports. The RAT type may be a common RAT type corresponding to multiple RAT types or a specific RAT type corresponding to a single RAT type. Accordingly, a UE 115 may log failed attempts at connecting to base stations associated with the one or more RAT types indicated in the MDT configuration. For instance, if the MDT measurement configuration or other configuration indicates a RAT type of NG-RAN, the UE 115 may log failed attempts at establishing an RRC connection with base stations associated with NR and LTE (e.g., E-UTRAN/5GC). If the UE 115 is configured to operate in a dual-connectivity mode, the UE 115 may log failed attempts at establishing an RRC connection with the master node and secondary node (e.g., including NE-DC, NG EN-DC, NR-NR DC, and NE-DC).

For each failed attempt at establishing an RRC connection with a base station, the UE 115 may store a time stamp of the elapsed time between logging the failed connection with the base station and reporting the log, a global cell identity of the base station when the connection fails (i.e., the base station that the UE 115 attempted to access), the latest available radio measurements for any frequency or RAT, the latest detailed location information (e.g., if available), the number of random access preambles transmitted, an indication of whether the maximum transmission power was used (e.g., in the attempt), the number of attempted beams, the beam indices, or the beam qualities (e.g., used in the attempt), an indication of whether contention was detected, the latest wireless local area network (WLAN) measurement results (e.g., if available), or the latest Bluetooth measurement results (e.g., if available).

Once the UE 115 logs the failed attempts at establishing RRC connections with a master node and a secondary node, for example, in one or more accessibility reports, it may be appropriate for the UE 115 to report the accessibility reports to the network (e.g., to be forwarded to the trace collection entity). In one example, the UE 115 may transmit the accessibility reports for the master node to the master node via a signaling radio bearer (SRB) 1, and the UE 115 may transmit the accessibility reports for the secondary node to the secondary node via an SRB 3. In another example, the UE 115 may transmit the accessibility reports for the master node and the secondary node to the master node via an SRB1 (e.g., when there is no SRB3 in the secondary node).

Figure 5:
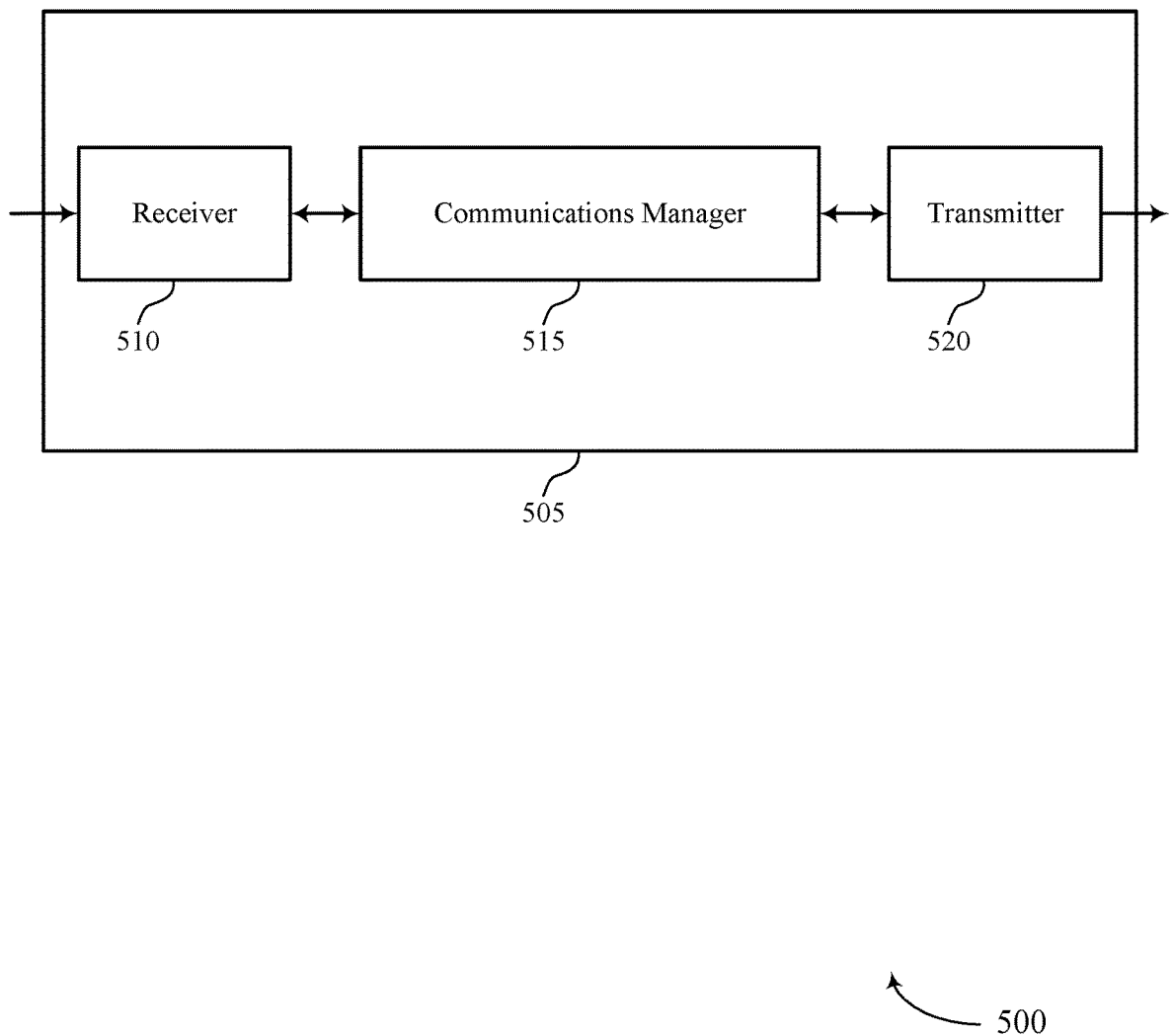
FIGS. 5 and 6 show block diagrams of devices that support MDT for multi-RAT dual connectivity in accordance with aspects of the present disclosure.

FIG. 5 shows a block diagram 500 of a device 505 that supports MDT for multi-RAT dual connectivity in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to MDT for multi-RAT dual connectivity, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a measurement configuration for collecting and reporting MDT measurements, identify one or more fields in the measurement configuration that indicate at least one of a RAT type for collecting MDT measurements and a RAT type for reporting MDT measurements, collect MDT measurements in accordance with the one or more fields within the measurement configuration, and transmit one or more reports including information indicative of the MDT measurements in accordance with the one or more fields within the measurement configuration.

The communications manager 515 may also identify that the UE is operating in a dual-connectivity deployment with a first base station and a second base station, where the second base station includes a non-standalone base station, transmit an indication of whether MDT measurements are supported by the UE for the non-standalone base station, and collect and report MDT measurements based on whether MDT measurements are supported by the UE for the non-standalone base station.

The communications manager 515 may also identify that the UE is configured to operate in a dual-connectivity deployment with a first base station and a second base station, determine that the UE failed to connect to the first base station, the second base station, or both, generate one or more accessibility reports, where the generating of the one or more accessibility reports is triggered by failure of the UE to connect to the first base station, the second base station, or both, and transmit the one or more accessibility reports indicating that the UE failed to connect to the first base station, the second base station, or both. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to collect measurements for one RAT and report the measurements via another RAT. Such techniques may improve reliability of MDT reports, which may result in fewer transmissions. The device 505 may also perform measurements for multiple RATs using the same configurations, which may simplify the process of collecting and reporting MDT measurements in a wireless communications system.

Based on improved reliability and efficiency, a processor of the device 505 may reduce a number of processing operations and may spend less time transmitting, which may result in increased power savings and improved battery life of the device 505.

Figure 6:
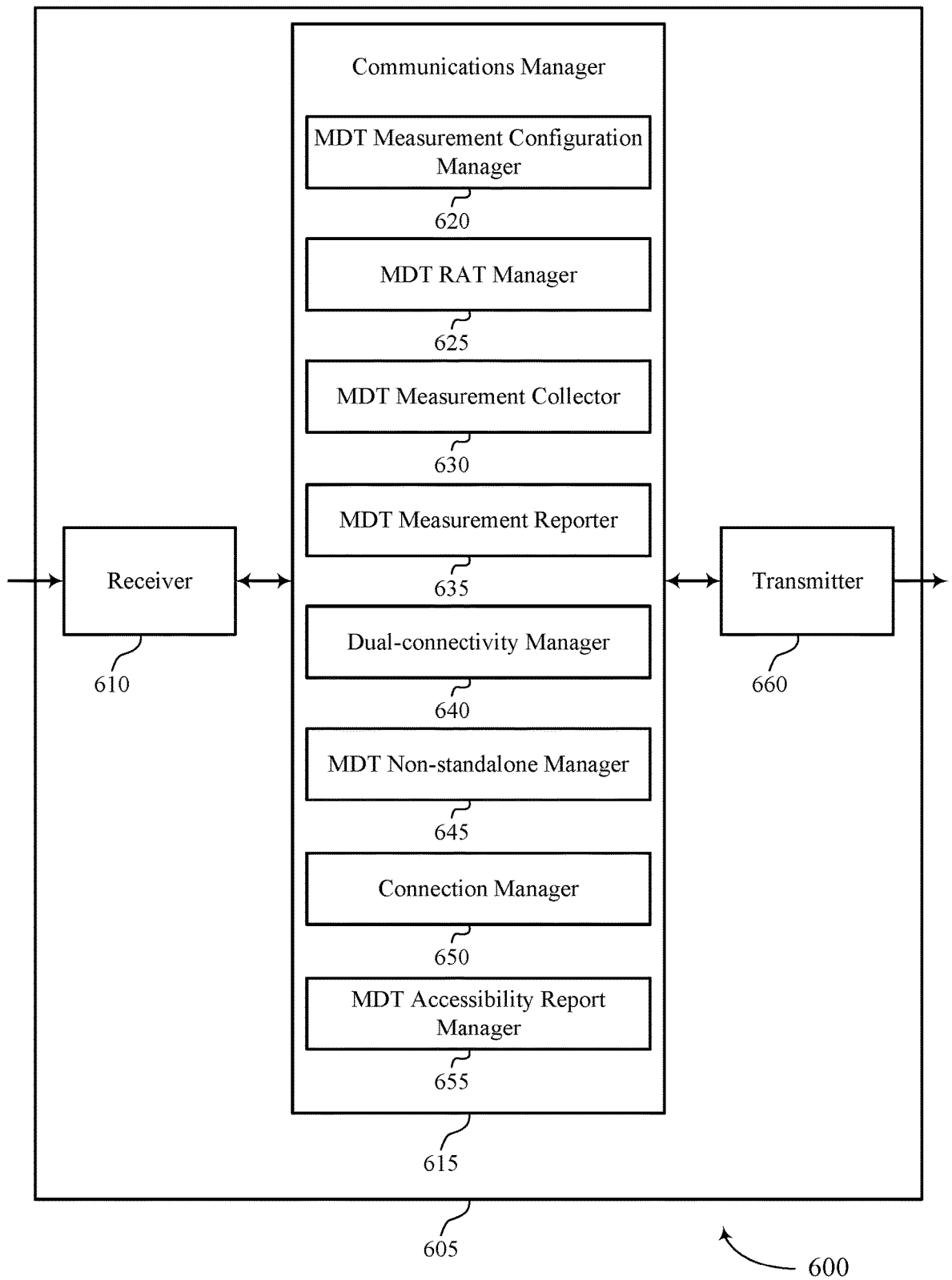

FIG. 6 shows a block diagram 600 of a device 605 that supports MDT for multi-RAT dual connectivity in accordance with aspects of the present disclosure. The device 605 may be an example of aspects of a device 505, or a UE 115 as described herein. The device 605 may include a receiver 610, a communications manager 615, and a transmitter 660. The device 605 may also include a processor. Each of these components may be in communication with one another (e.g., via one or more buses).

The receiver 610 may receive information such as packets, user data, or control information associated with various information channels (e.g., control channels, data channels, and information related to MDT for multi-RAT dual connectivity, etc.) Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an MDT measurement configuration manager 620, an MDT RAT manager 625, an MDT measurement collector 630, an MDT measurement reporter 635, a dual-connectivity manager 640, an MDT non-standalone manager 645, a connection manager 650, and an MDT accessibility report manager 655. The communications manager 615 may be an example of aspects of the communications manager 810 described herein.

The MDT measurement configuration manager 620 may receive a measurement configuration for collecting and reporting MDT measurements. The MDT RAT manager 625 may identify one or more fields in the measurement configuration that indicate at least one of a RAT type for collecting MDT measurements and a RAT type for reporting MDT measurements. The MDT measurement collector 630 may collect MDT measurements in accordance with the one or more fields within the measurement configuration. The MDT measurement reporter 635 may transmit one or more reports including information indicative of the MDT measurements in accordance with the one or more fields within the measurement configuration.

The dual-connectivity manager 640 may identify that the UE is operating in a dual-connectivity deployment with a first base station and a second base station, where the second base station includes a non-standalone base station. The MDT non-standalone manager 645 may transmit an indication of whether MDT measurements are supported by the UE for the non-standalone base station. The MDT measurement collector 630 and the MDT measurement reporter 635 may collect and report MDT measurements based on whether MDT measurements are supported by the UE for the non-standalone base station.

The dual-connectivity manager 640 may identify that the UE is configured to operate in a dual-connectivity deployment with a first base station and a second base station. The connection manager 650 may determine that the UE failed to connect to the first base station, the second base station, or both. The MDT accessibility report manager 655 may generate one or more accessibility reports, where the generating of the one or more accessibility reports is triggered by failure of the UE to connect to the first base station, the second base station, or both and transmit the one or more accessibility reports indicating that the UE failed to connect to the first base station, the second base station, or both.

The transmitter 660 may transmit signals generated by other components of the device 605. In some examples, the transmitter 660 may be collocated with a receiver 610 in a transceiver module. For example, the transmitter 660 may be an example of aspects of the transceiver 820 described with reference to FIG. 8. The transmitter 660 may utilize a single antenna or a set of antennas.

Figure 7:
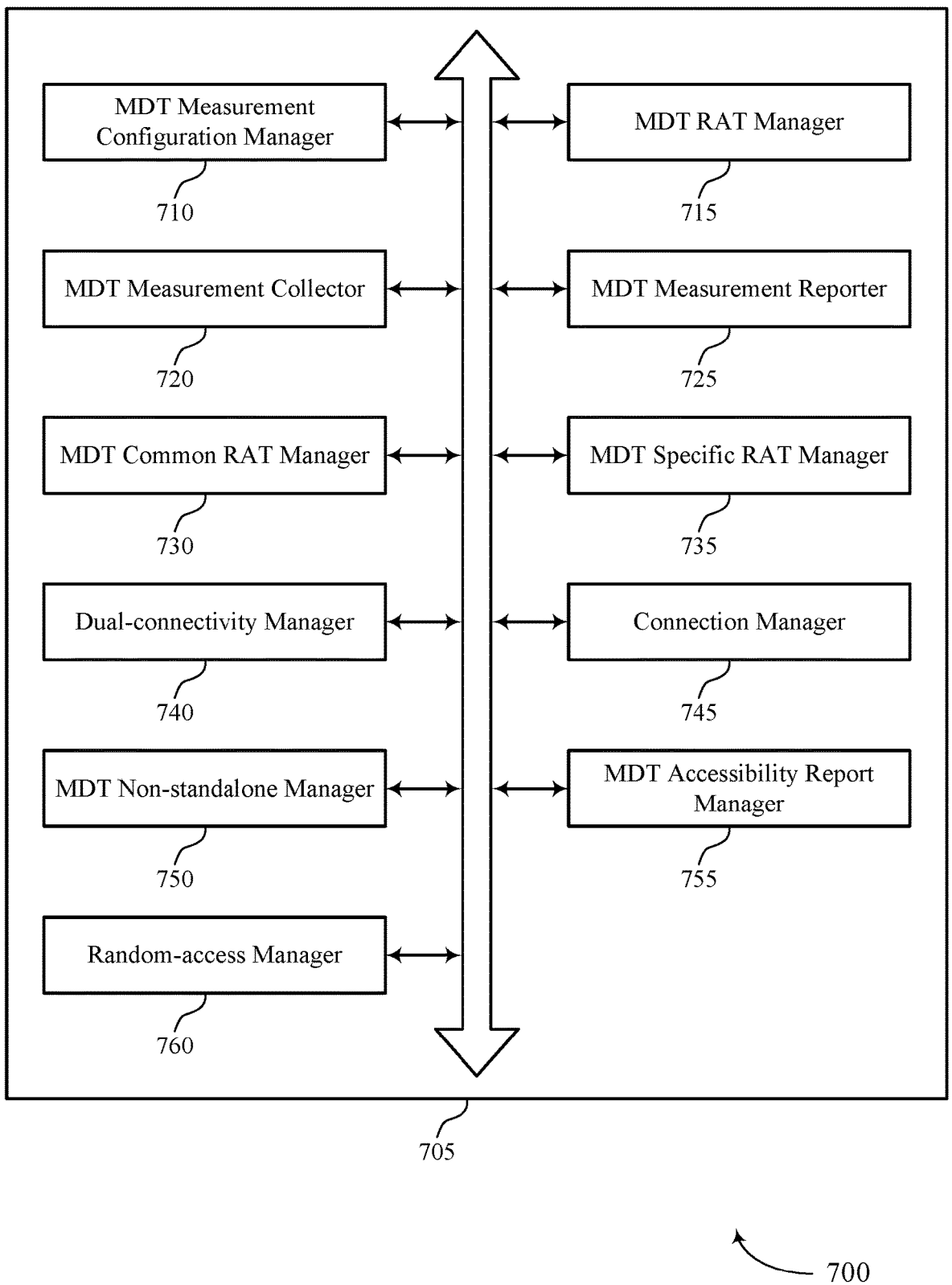
FIG. 7 shows a block diagram of a communications manager that supports MDT for multi-RAT dual connectivity in accordance with aspects of the present disclosure.

FIG. 7 shows a block diagram 700 of a communications manager 705 that supports MDT for multi-RAT dual connectivity in accordance with aspects of the present disclosure. The communications manager 705 may be an example of aspects of a communications manager 515, a communications manager 615, or a communications manager 810 described herein. The communications manager 705 may include an MDT measurement configuration manager 710, an MDT RAT manager 715, an MDT measurement collector 720, an MDT measurement reporter 725, an MDT common RAT manager 730, an MDT specific RAT manager 735, a dual-connectivity manager 740, a connection manager 745, an MDT non-standalone manager 750, an MDT accessibility report manager 755, and a random-access manager 760. Each of these modules may communicate, directly or indirectly, with one another (e.g., via one or more buses).

The MDT measurement configuration manager 710 may receive a measurement configuration for collecting and reporting MDT measurements. In some examples, the MDT measurement configuration manager 710 may receive a measurement configuration for collecting and reporting MDT measurements, the measurement configuration indicating a RAT type with a restriction to non-standalone base stations, standalone base stations, or both. In some examples, the MDT measurement configuration manager 710 may identify an indication in the measurement configuration of whether the measurement configuration applies when the UE is configured to operate in a dual-connectivity mode (e.g., or whether the measurement configuration applies when the UE is configured to operate in a single-connectivity mode). In some cases, the measurement configuration may include a logged MDT measurement configuration, and the one or more reports may include logged measurement reports. In some cases, the measurement configuration includes an immediate MDT measurement configuration, and the one or more reports include immediate measurement reports.

The MDT RAT manager 715 may identify one or more fields in the measurement configuration that indicate at least one of a RAT type for collecting MDT measurements and a RAT type for reporting MDT measurements. The MDT measurement collector 720 may collect MDT measurements in accordance with the one or more fields within the measurement configuration, in some examples, the MDT measurement collector 720 and the MDT measurement reporter 725 may collect and report MDT measurements based on whether MDT measurements are supported by the UE for the non-standalone base station.

In some examples, the MDT measurement collector 720 and the MDT measurement reporter 725 may collect and report MDT measurements for the first RAT and the second RAT based on the measurement configuration. In some examples, the MDT measurement collector 720 may collect a first set of MDT measurements for a first RAT, or a second set of MDT measurements for a second RAT, or both based on the one or more fields within the measurement configuration.

In some examples, the MDT measurement collector 720 may collect MDT measurements for the non-standalone base station. In some examples, the MDT measurement collector 720 and the MDT measurement reporter 725 may collect and report MDT measurements for the RAT type based on the restriction. In some cases, the MDT measurements include logged MDT measurements. The MDT measurement reporter 725 may transmit one or more reports including information indicative of the MDT measurements in accordance with the one or more fields within the measurement configuration.

In some examples, the MDT measurement reporter 725 may transmit a report including MDT measurements associated with a second RAT to the base station associated with the first RAT. In some examples, the MDT measurement reporter 725 may report the MDT measurements to the first base station. In some examples, the MDT measurement reporter 725 may report the MDT measurements to the standalone base station. In some examples, the MDT measurement reporter 725 may indicate, in the one or more reports, whether the MDT measurements were collected in a dual-connectivity mode. The dual-connectivity manager 740 may identify that the UE is operating in a dual-connectivity deployment with a first base station and a second base station, where the second base station includes a non-standalone base station.

In some examples, the dual-connectivity manager 740 may identify that the UE is configured to operate in a dual-connectivity deployment with a first base station and a second base station. In some examples, the dual-connectivity manager 740 may identify that the UE is operating in a dual-connectivity deployment with a first base station associated with a first RAT and a second base station associated with a second RAT. In some cases, the first base station is a master node and the second base station is a secondary node. In some cases, the first RAT or the second RAT includes NR, LTE, LTE LAA, or NR-U.

The connection manager 745 may determine that the UE failed to connect to the first base station, the second base station, or both. In some examples, the connection manager 745 may connect to a base station associated with a first RAT. The MDT non-standalone manager 750 may transmit an indication of whether MDT measurements are supported by the UE for the non-standalone base station. In some examples, the MDT non-standalone manager 750 may transmit, to the first base station, the first indication of whether MDT measurements are supported by the UE for the non-standalone base station. In some examples, the MDT non-standalone manager 750 may transmit, to the first base station, a second indication of Whether MDT measurements are supported by the UE for the first base station.

In some examples, the MDT non-standalone manager 750 may transmit, in a transparent container to the first base station, the indication of whether MDT measurements are supported by the UE for the non-standalone base station. In some examples, the MDT non-standalone manager 750 may transmit, to a standalone base station associated with a same RAT as the non-standalone base station, the indication of whether MDT measurements are supported by the UE fir the non-standalone base station. In some examples, determining that the second base station includes a non-standalone base station may be based on failing to receive a SIB 1 broadcast from the second base station.

In some cases, the first indication and the second indication may be transmitted in a two-bit MDT availability indication. In some cases, the first indication and the second indication are transmitted separately. The MDT accessibility report manager 755 may generate one or more accessibility reports, where the generating of the one or more accessibility reports may be triggered by failure of the UE to connect to the first base station, the second base station, or both. In some examples, the MDT accessibility report manager 755 may transmit the one or more accessibility reports indicating that the UE failed to connect to the first base station, the second base station, or both. In some examples, the MDT accessibility report manager 755 may transmit, to the first base station, a first accessibility report indicating that the UE failed to connect to the first base station.

In some examples, the MDT accessibility report manager 755 may transmit, to the second base station, a second accessibility report indicating that the UE failed to connect to the second base station. In some examples, the MDT accessibility report manager 755 may transmit, to the first base station, an accessibility report indicating that the UE failed to connect to the first base station or that the UE failed to connect to the second base station. In some cases, the first accessibility report is transmitted in an SRB 1, and the second accessibility report is transmitted in an SRB 3. In some cases, the accessibility report is transmitted in an SRB 1.

In some examples, the MDT accessibility report manager 755 may store a time stamp of the elapsed time between logging the failed connection to the first base station or the second base station and reporting the log, a global cell identity of the first base station or the second base station, an indication of latest available radio measurements for any frequency or RAT, an indication of latest detailed location information, a number of random access preambles transmitted, an indication of whether the maximum transmission power was used, an indication of a number of attempted beams, an indication of whether contention was detected, an indication of latest wireless local area network measurement results, an indication of latest Bluetooth measurement results, or a combination thereof.

The MDT common RAT manager 730 may determine that the one or more fields within the measurement configuration indicate a common RAT type for collecting or reporting MDT measurements, where the common RAT type includes measurement configurations for multiple RAT types. In some examples, the MDT common RAT manager 730 may determine that the one or more fields within the measurement configuration indicate a common RAT type for collecting or reporting MDT measurements, where the common RAT type indicates that the measurement configuration is to be used for collecting or reporting measurements for the first RAT and the second RAT (e.g., the MDT applies when the UE is connected to the first RAT and second RAT in a dual connectivity operation).

In some cases, the common RAT type may include an NGRAN. The MDT specific RAT manager 735 may determine that the one or more fields within the measurement configuration indicate a specific RAT type for collecting or reporting MDT measurements. The random-access manager 760 may attempt to gain access to the first base station or the second base station via a random-access procedure. In some examples, the random-access manager 760 may determine that the random-access procedure failed.

Figure 8:
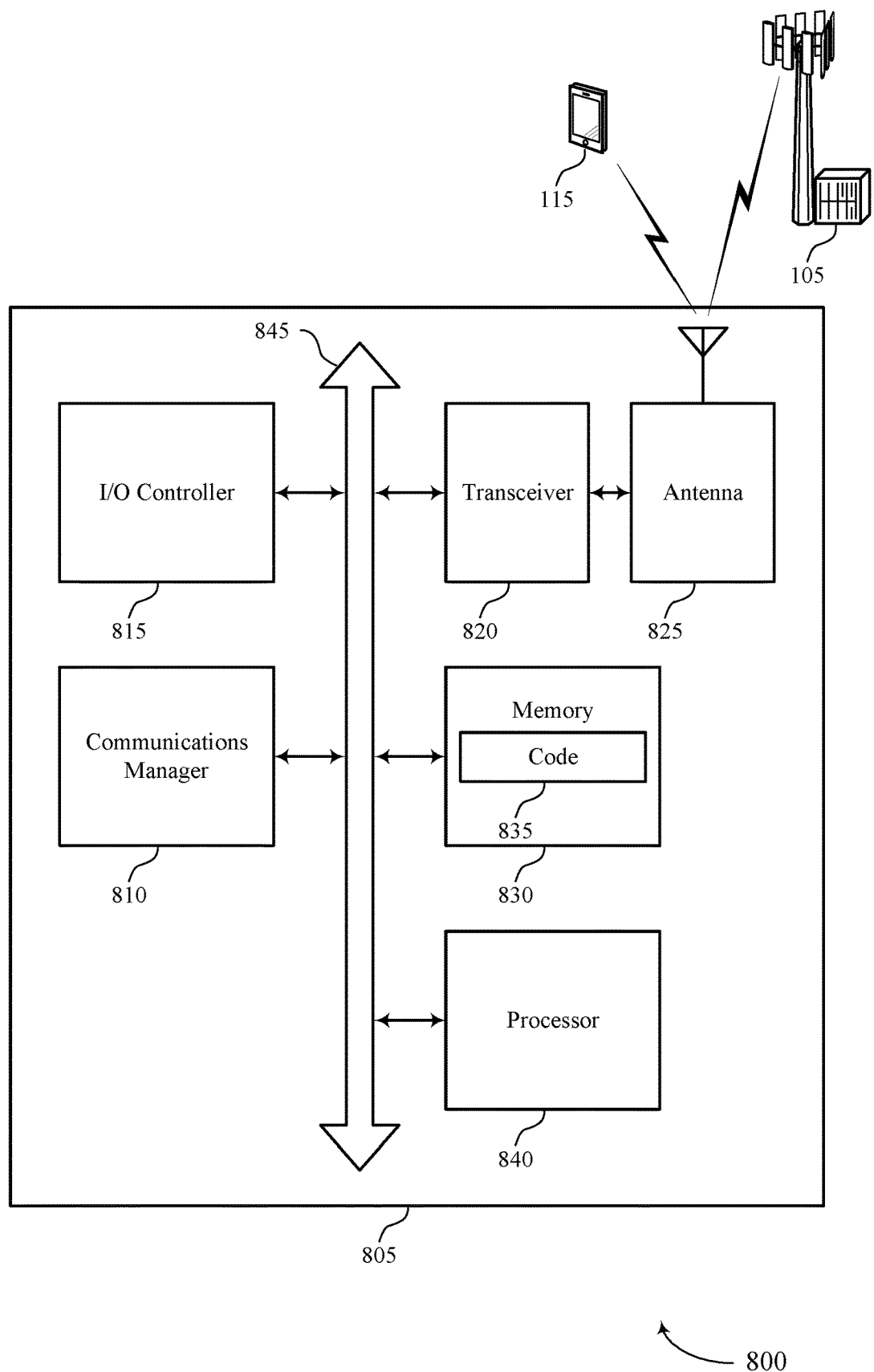
FIG. 8 shows a diagram of a system including a device that supports MDT for multi-RAT dual connectivity in accordance with aspects of the present disclosure.

FIG. 8 shows a diagram of a system 800 including a device 805 that supports MDT for multi-RAT dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a measurement configuration for collecting and reporting MDT measurements, identify one or more fields in the measurement configuration that indicate at least one of a RAT type for collecting MDT measurements and a RAT type for reporting MDT measurements, collect MDT measurements in accordance with the one or more fields within the measurement configuration, and transmit one or more reports including information indicative of the MDT measurements in accordance with the one or more fields within the measurement configuration.

The communications manager 810 may also identify that the UE is operating in a dual-connectivity deployment with a first base station and a second base station, where the second base station includes a non-standalone base station, transmit an indication of whether MDT measurements are supported by the UE for the non-standalone base station, and collect and report MDT measurements based on whether MDT measurements are supported by the UE for the non-standalone base station.

The communications manager 810 may also identify that the UE is configured to operate in a dual-connectivity deployment with a first base station and a second base station, determine that the UE failed to connect to the first base station, the second base station, or both, generate one or more accessibility reports, where the generating of the one or more accessibility reports is triggered by failure of the UE to connect to the first base station, the second base station, or both, and transmit the one or more accessibility reports indicating that the UE failed to connect to the first base station, the second base station, or both.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting MDT for multi-RAT dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
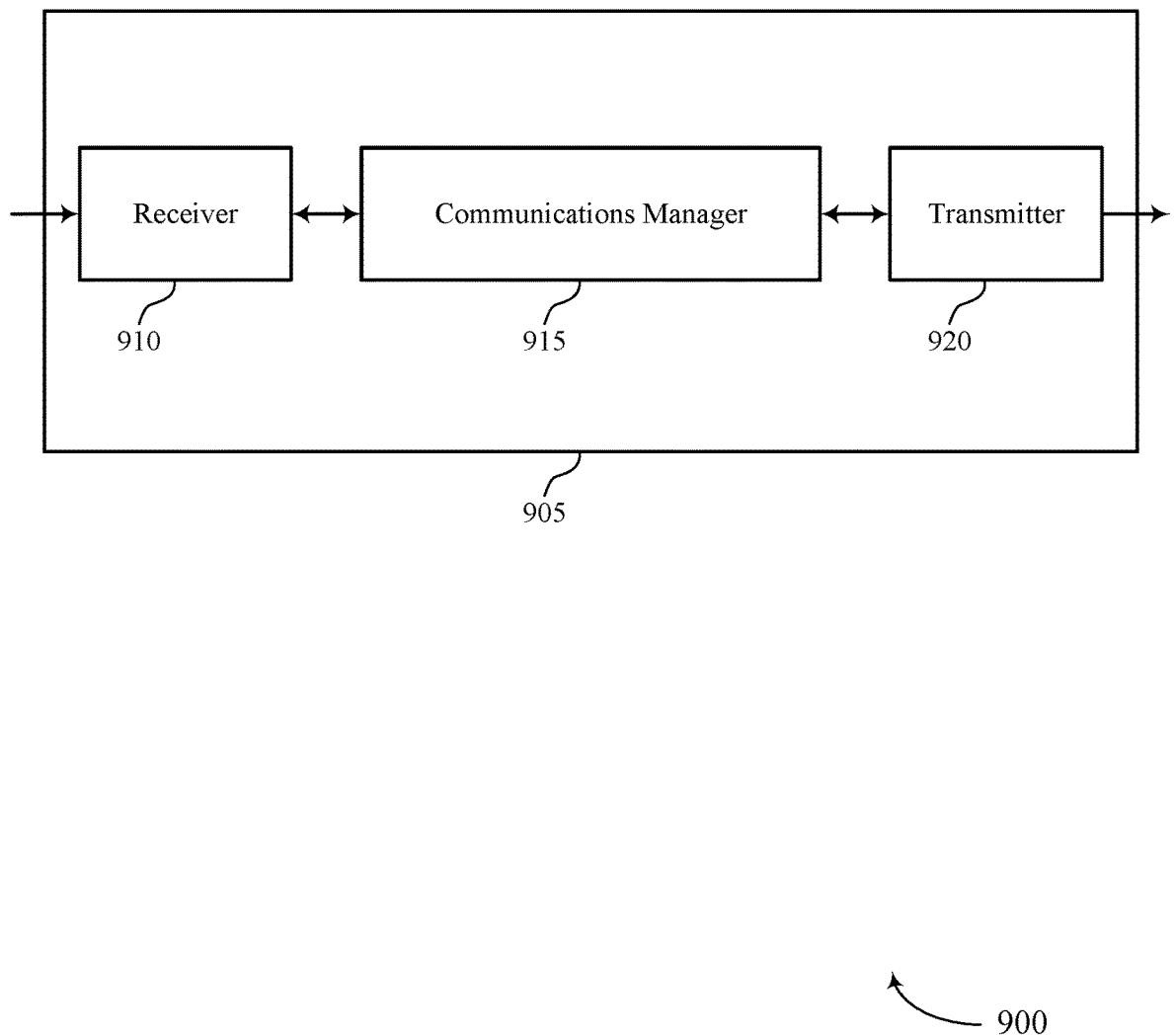
FIGS. 9 and 10 show block diagrams of devices that support MDT fir multi-RAT dual connectivity in accordance with aspects of the present disclosure.

FIG. 9 shows a block diagram 900 of a device 905 that supports MDT for multi-RAT dual connectivity in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to MDT for multi-RAT dual connectivity, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify at least one of a RAT type for a UE to use to collect MDT measurements and a RAT type for the UE to use to report MDT measurements, generate a measurement configuration including one or more fields that indicate the at least one of a RAT type for collecting MDT measurements and the RAT type for reporting MDT measurements, transmit the measurement configuration, and receive one or more reports including information indicative of MDT measurements in accordance with the measurement configuration.

The communications manager 915 may also identify that the base station is a master node and that a non-standalone base station is a secondary node for a UE operating in a dual-connectivity deployment, receive an indication of whether MDT measurements are supported by the UE for the non-standalone base station, and receive MDT measurements based on whether MDT measurements are supported by the UE for the non-standalone base station. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
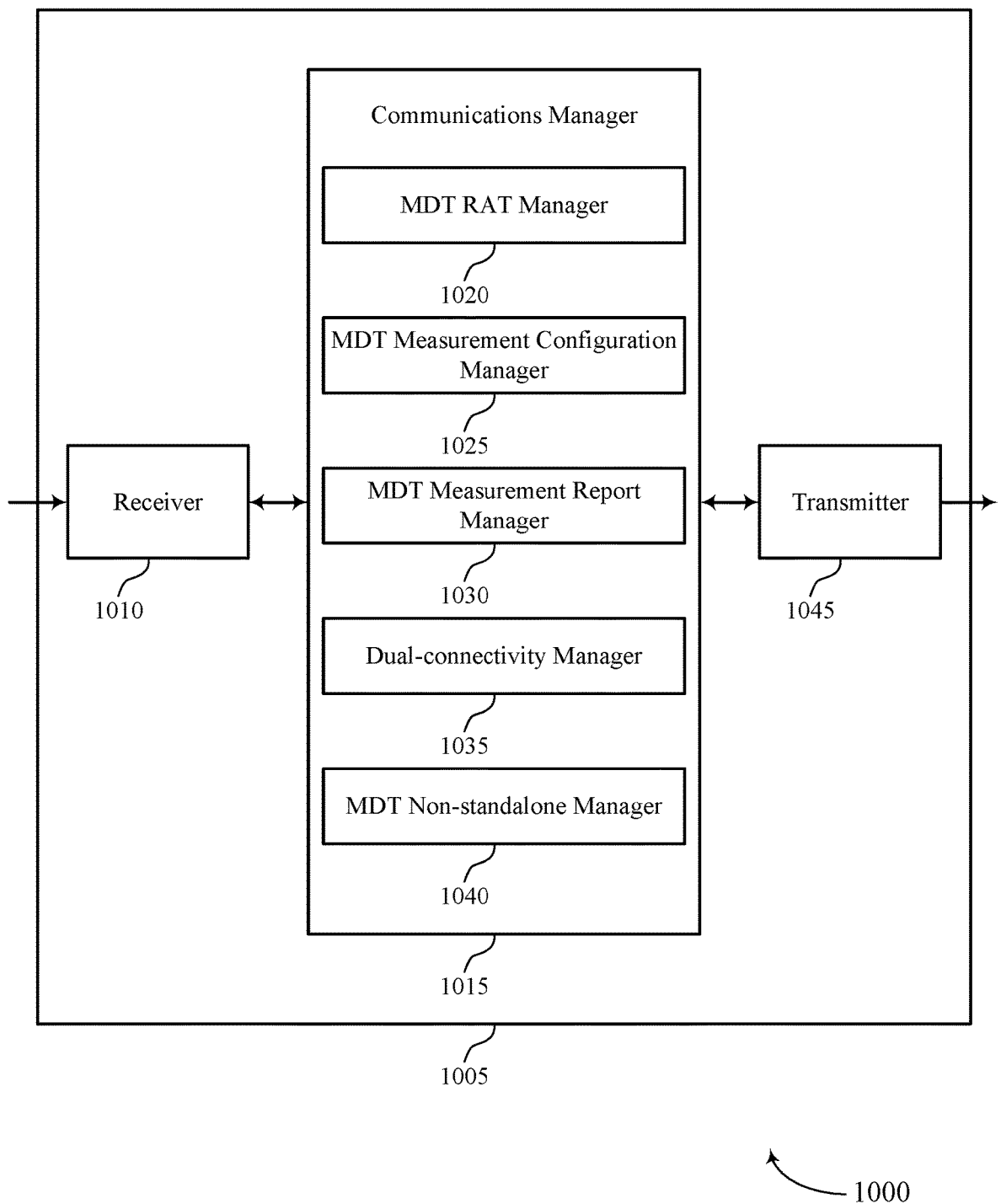

FIG. 10 shows a block diagram 1000 of a device 1005 that supports MDT for multi-RAT dual connectivity in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to MDT for multi-RAT dual connectivity, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an MDT RAT manager 1020, an MDT measurement configuration manager 1025, an MDT measurement report manager 1030, a dual-connectivity manager 1035, and an MDT non-standalone manager 1040. The communications manager 1015 may be an example of aspects of the communications manager 1210 described herein.

The MDT RAT manager 1020 may identify at least one of a RAT type for a UE to use to collect MDT measurements and a RAT type for the UE, to use to report MDT measurements. The MDT measurement configuration manager 1025 may generate a measurement configuration including one or more fields that indicate the at least one of a RAT type for collecting MDT measurements and the RAT type for reporting MDT measurements and transmit the measurement configuration. The MDT measurement report manager 1030 may receive one or more reports including information indicative of MDT measurements in accordance with the measurement configuration.

The dual-connectivity manager 1035 may identify that the base station is a master node and that a non-standalone base station is a secondary node for a UE operating in a dual-connectivity deployment. The MDT non-standalone manager 1040 may receive an indication of whether MDT measurements are supported by the UE for the non-standalone base station. The MDT measurement report manager 1030 may receive MDT measurements based on whether MDT measurements are supported by the UE for the non-standalone base station.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
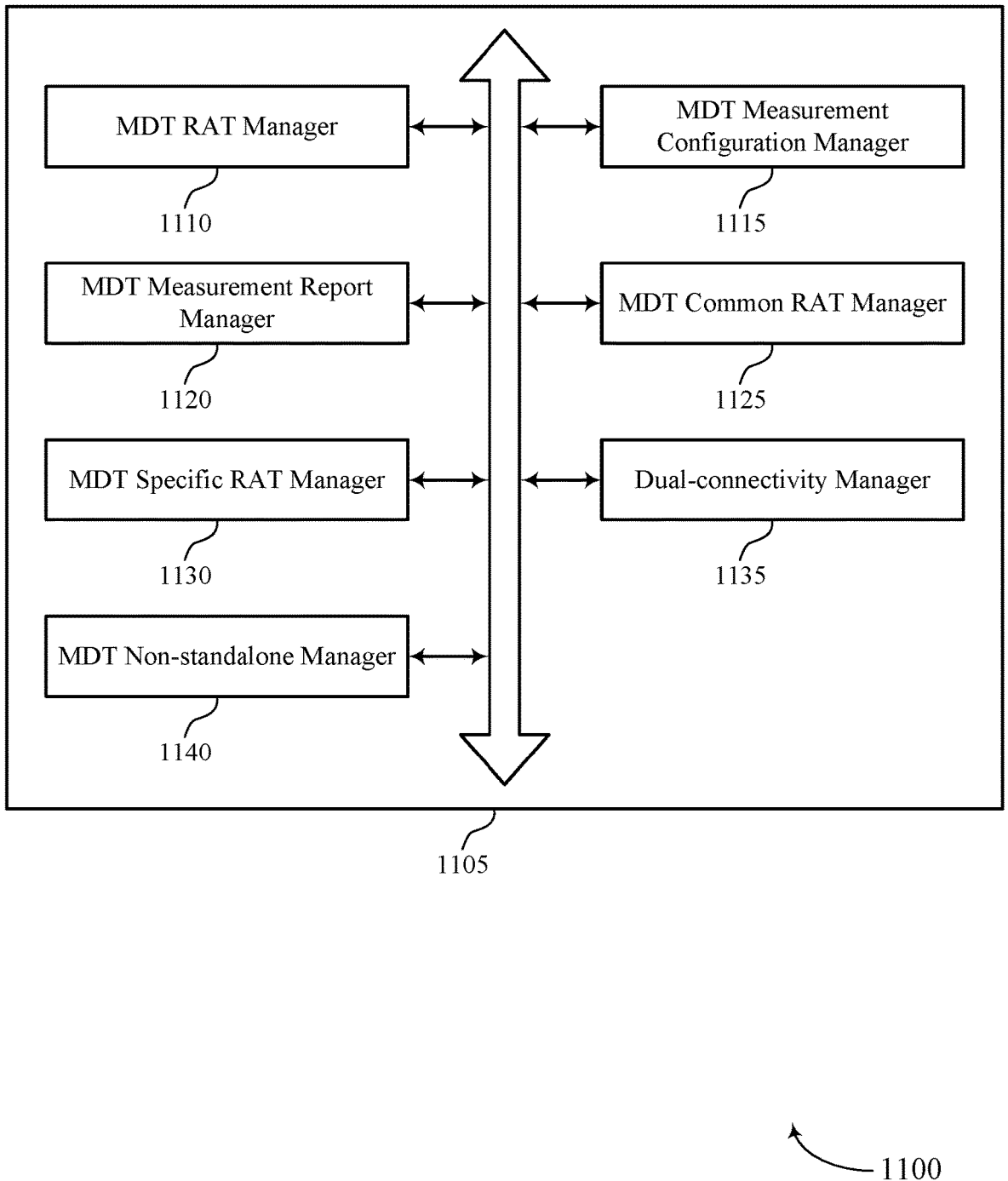
FIG. 11 shows a block diagram of a communications manager that supports MDT for multi-RAT dual connectivity in accordance with aspects of the present disclosure.

FIG. 11 shows a block diagram 1100 of a communications manager 1105 that supports MDT for multi-RAT dual connectivity in accordance with aspects of the present disclosure. The communications manager 1105 may be an example of aspects of a communications manager 915, a communications manager 1015, or a communications manager 1210 described herein. The communications manager 1105 may include an MDT RAT manager 1110, an MDT measurement configuration manager 1115, an MDT measurement report manager 1120, an MDT common RAT manager 1125, an MDT specific RAT manager 1130, a dual-connectivity manager 1135, and an MDT non-standalone manager 1140. Each of these modules may communicate, directly or indirectly, with one another (e.g., via one or more buses).

The MDT RAT manager 1110 may identify at least one of a RAT type for a UE to use to collect MDT measurements and a RAT type for the UE to use to report MDT measurements. The MDT measurement configuration manager 1115 may generate a measurement configuration including one or more fields that indicate the at least one of a RAT type for collecting MDT measurements and the RAT type for reporting MDT measurements. In some examples, the MDT measurement configuration manager 1115 may transmit the measurement configuration.

In some examples, the MDT measurement configuration manager 1115 may transmit a measurement configuration to be used by the UE for collecting and reporting MDT measurements, the measurement configuration indicating a RAT type with a restriction to non-standalone base stations, standalone base stations, or both. In some examples, the MDT measurement configuration manager 1115 may transmit an indication in the measurement configuration of whether the measurement configuration applies when the UE is configured to operate in a dual-connectivity mode (e.g., or whether the measurement configuration applies when the UE is configured to operate in a single-connectivity mode). In some cases, the measurement configuration includes a logged MDT measurement configuration, and the one or more reports include logged measurement reports. In some cases, the measurement configuration includes an immediate MDT measurement configuration, and the one or more reports include immediate measurement reports.

The MDT measurement report manager 1120 may receive one or more reports including information indicative of MDT measurements in accordance with the measurement configuration. In some examples, the MDT measurement report manager 1120 may receive MDT measurements based on whether MDT measurements are supported by the UE for the non-standalone base station. In some examples, the MDT measurement report manager 1120 may receive a report including MDT measurements associated with a second RAT. In some examples, the MDT measurement report manager 1120 may receive MDT measurements for the non-standalone base station from the UE. In some examples, the MDT measurement report manager 1120 may receive MDT measurements for the RAT type based on the restriction. In some cases, the MDT measurements include logged MDT measurements. In some examples, the MDT measurement report manager 1120 may receive, in the one or more reports, an indication of whether the MDT measurements were collected in a dual-connectivity mode.

The dual-connectivity manager 1135 may identify that the base station is a master node and that a non-standalone base station is a secondary node for a UE operating in a dual-connectivity deployment. The MDT non-standalone manager 1140 may receive an indication of whether MDT measurements are supported by the UE for the non-standalone base station. In some examples, the MDT non-standalone manager 1140 may receive, from the UE, the first indication of whether MDT measurements are supported by the UE for the non-standalone base station. In some examples, the MDT non-standalone manager 1140 may receive, from the UE, a second indication of whether MDT measurements are supported by the UE for the base station.

In some examples, the MDT non-standalone manager 1140 may receive, in a transparent container from the UE, the indication of whether MDT measurements are supported by the UE for the non-standalone base station. In some cases, the first indication and the second indication are received in a two-bit MDT availability indication. In some cases, the first indication and the second indication are received separately. The MDT common RAT manager 1125 may identify a common RAT type for the UE to use to collect or report MDT measurements, where the common RAT type includes measurement configurations for multiple RAT types. In some cases, the common RAT type includes a NGRAN. The MDT specific RAT manager 1130 may identify a specific RAT type for the UE to use to collect or report MDT measurements.

Figure 12:
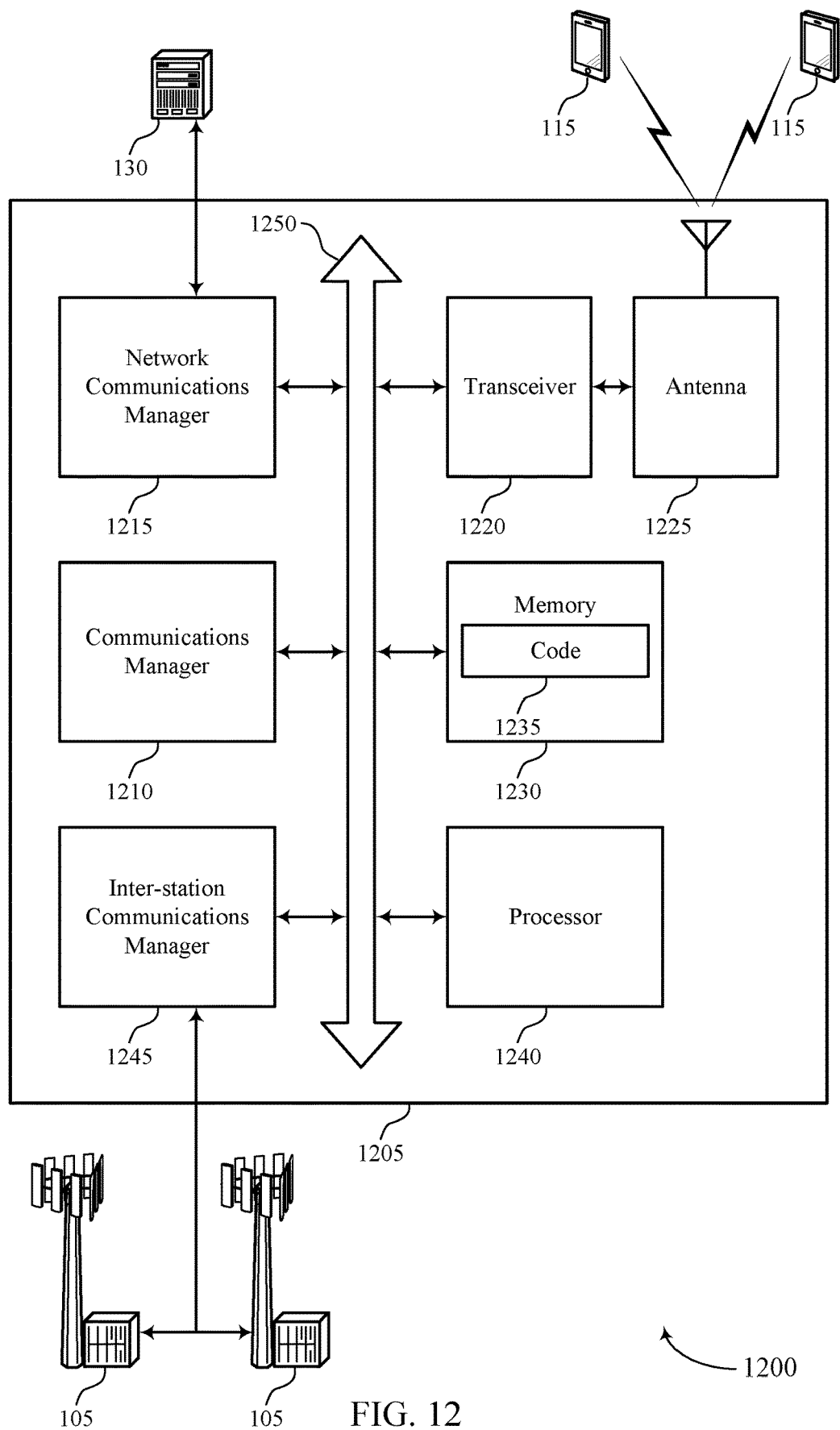
FIG. 12 shows a diagram of a system including a device that supports MDT fbr multi-RAT dual connectivity in accordance with aspects of the present disclosure.

FIG. 12 shows a diagram of a system 1200 including a device 1205 that supports MDT for multi-RAT dual connectivity in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify at least one of a RAT type for a UE to use to collect MDT measurements and a RAT type for the UE to use to report MDT measurements, generate a measurement configuration including one or more fields that indicate the at least one of a RAT type for collecting MDT measurements and the RAT type for reporting MDT measurements, transmit the measurement configuration, and receive one or more reports including information indicative of MDT measurements in accordance with the measurement configuration.

The communications manager 1210 may also identify that the base station is a master node and that a non-standalone base station is a secondary node for a UE operating in a dual-connectivity deployment, receive an indication of whether MDT measurements are supported by the UE for the non-standalone base station, and receive MDT measurements based on whether MDT measurements are supported by the UE for the non-standalone base station.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device. (e.g., a general-purpose processor, a DSP, a CPU, a microcontroller, apt ASIC, air FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting MDT for multi-RAT dual connectivity).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
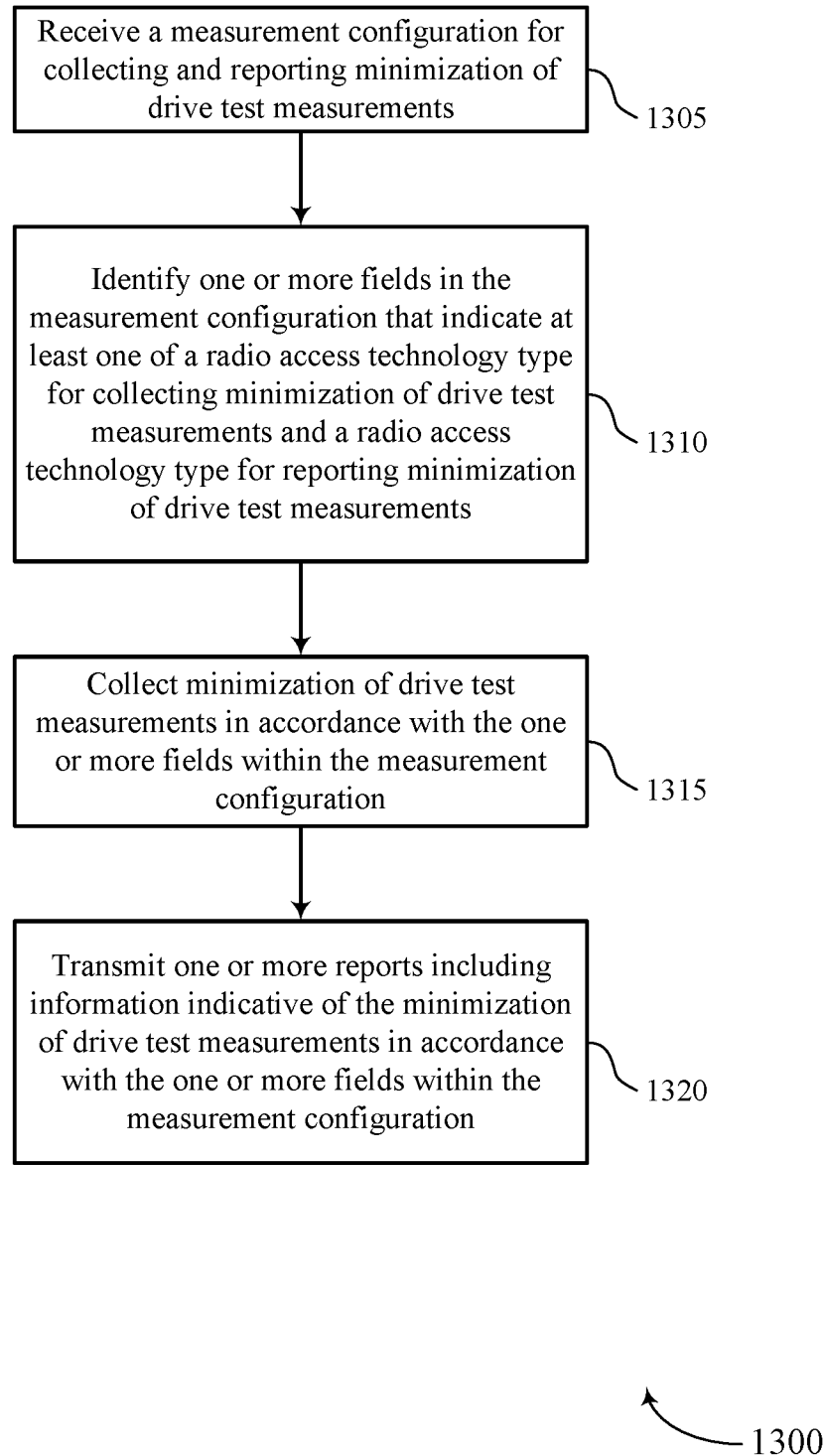
FIGS. 13 through 17 show flowcharts illustrating methods that support IVIDT for multi-RAT dual connectivity in accordance with aspects of the present disclosure.

FIG. 13 shows a flowchart illustrating a method 1300 that supports MDT for multi-RAT dual connectivity in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive a measurement configuration for collecting and reporting MDT measurements. The operations of 1305 may be performed according to the methods described herein. In some examples, aspects of the operations of 1305 may be performed by an MDT measurement configuration manager as described with reference to FIGS. 5 through 8.

At 1310, the UE may identify one or more fields in the measurement configuration that indicate at least one of a RAT type for collecting the MDT measurements and a RAT type for reporting the MDT measurements. The operations of 1310 may be performed according to the methods described herein. In some examples, aspects of the operations of 1310 may be performed by an MDT RAT manager as described with reference to FIGS. 5 through 8.

At 1315, the UE may collect the MDT measurements in accordance with the one or more fields within the measurement configuration. The operations of 1315 may be performed according to the methods described herein. In some examples, aspects of the operations of 1315 may be performed by an MDT measurement collector as described with reference to FIGS. 5 through 8.

At 1320, the UE may transmit one or more reports including information indicative of the MDT measurements in accordance with the one or more fields within the measurement configuration. The operations of 1320 may be performed according to the methods described herein. In some examples, aspects of the operations of 1320 may be performed by an MDT measurement reporter as described with reference to FIGS. 5 through 8.

Figure 14:
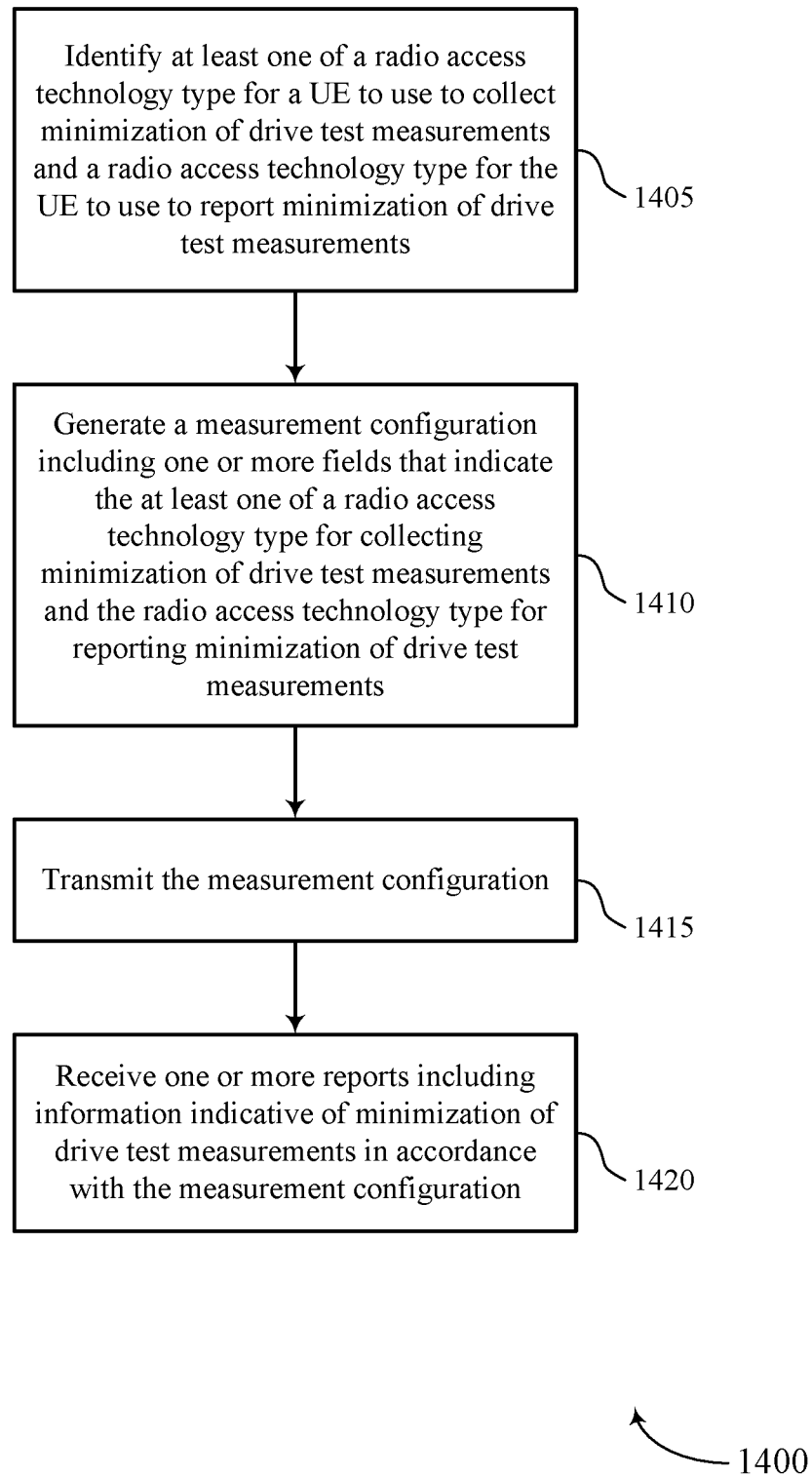

FIG. 14 shows a flowchart illustrating a method 1400 that supports MDT for multi-RAT dual connectivity in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may identify at least one of a RAT type for a UE to use to collect MDT measurements and a RAT type for the UE to use to report the MDT measurements. The operations of 1405 may be performed according to the methods described herein. In some examples, aspects of the operations of 1405 may be performed by an MDT RAT manager as described with reference to FIGS. 9 through 12.

At 1410, the base station may generate a measurement configuration including one or more fields that indicate the at least one of a RAT type for collecting the MDT measurements and the RAT type for reporting the MDT measurements. The operations of 1410 may be performed according to the methods described herein. In some examples, aspects of the operations of 1410 may be performed by an MDT measurement configuration manager as described with reference to FIGS. 9 through 12.

At 1415, the base station may transmit the measurement configuration. The operations of 1415 may be performed according to the methods described herein. In some examples, aspects of the operations of 1415 may be performed by an MDT measurement configuration manager as described with reference to FIGS. 9 through 12.

At 1420, the base station may receive one or more reports including information indicative of the MDT measurements in accordance with the measurement configuration. The operations of 1420 may be performed according to the methods described herein. In some examples, aspects of the operations of 1420 may be performed by an MDT measurement report manager as described with reference to FIGS. 9 through 12.

Figure 15:
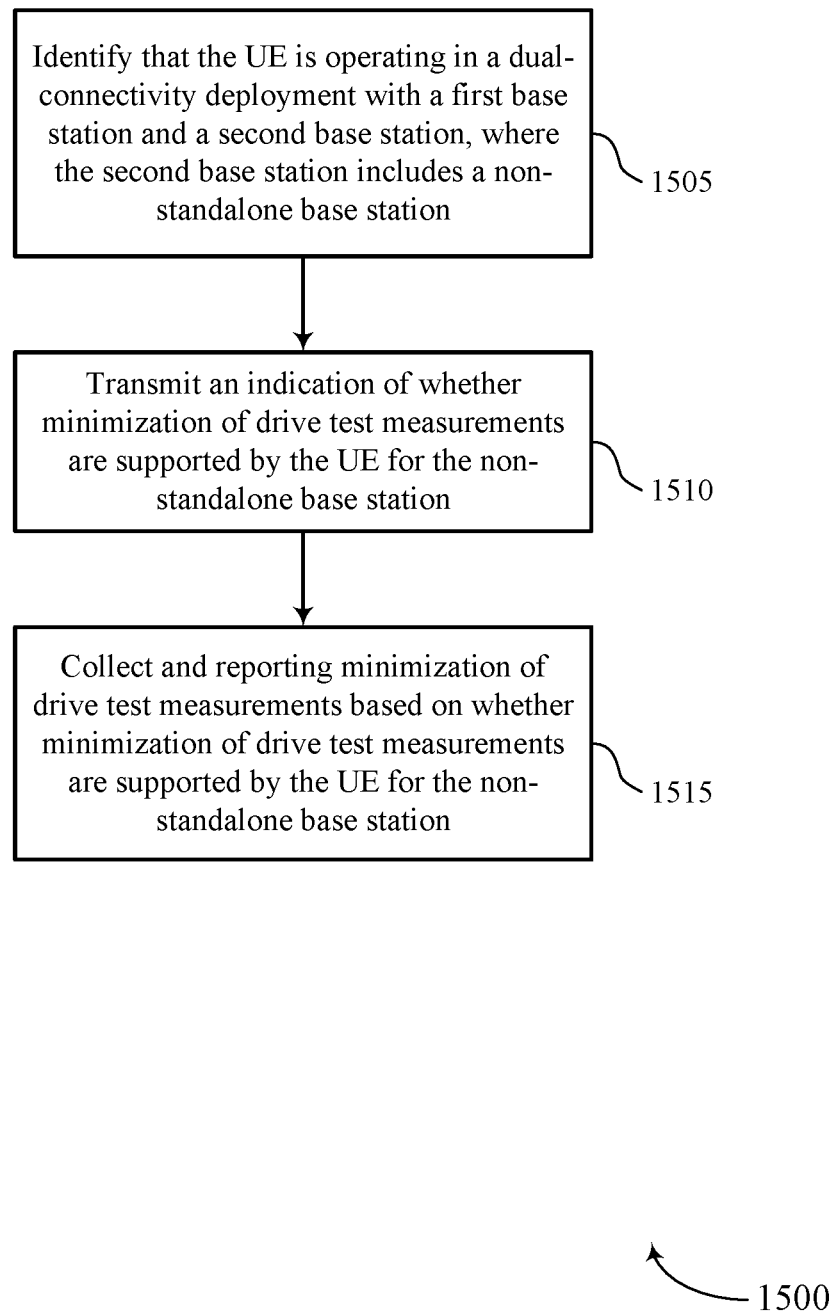

FIG. 15 shows a flowchart illustrating a method 1500 that supports MDT for multi-RAT dual connectivity in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1505, the UE may identify that the UE, is operating in a dual-connectivity deployment with a first base station and a second base station, where the second base station includes a non-standalone base station. The operations of 1505 may be performed according to the methods described herein. In some examples, aspects of the operations of 1505 may be performed by a dual-connectivity manager as described with reference to FIGS. 5 through 8.

At 1510, the UE may transmit an indication of whether MDT measurements are supported by the UE for the non-standalone base station. The operations of 1510 may be performed according to the methods described herein. In some examples, aspects of the operations of 1510 may be performed by an MDT non-standalone manager as described with reference to FIGS. 5 through 8.

At 1515, the UE may collect and report the MDT measurements based on whether the MDT measurements are supported by the UE for the non-standalone base station. The operations of 1515 may be performed according to the methods described herein. In some examples, aspects of the operations of 1515 may be performed by an MDT measurement collector as described with reference to FIGS. 5 through 8.

Figure 16:
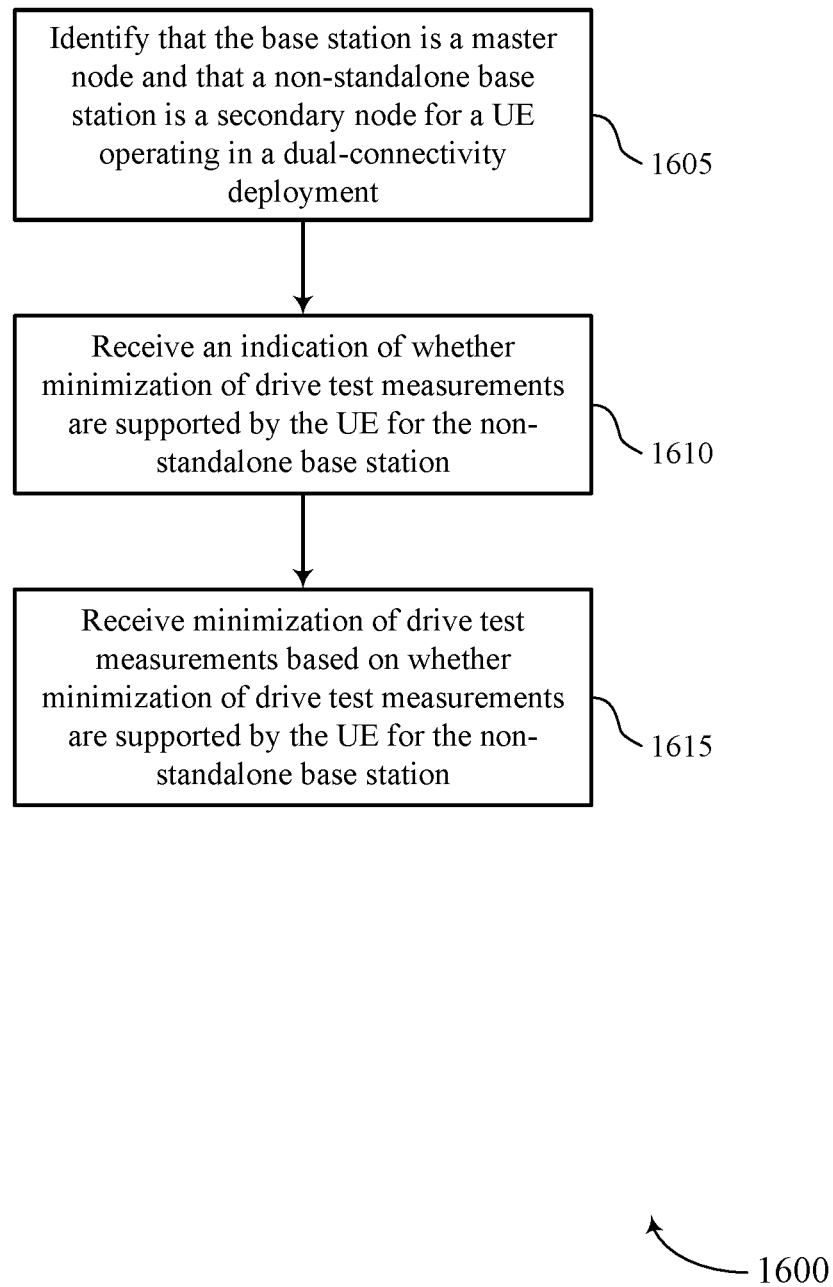

FIG. 16 shows a flowchart illustrating a method 1600 that supports MDT for multi-RAT dual connectivity in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1605, the base station may identify that the base station is a master node and that a non-standalone base station is a secondary node for a UE operating in a dual-connectivity deployment. The operations of 1605 may be performed according to the methods described herein. In some examples, aspects of the operations of 1605 may be performed by a dual-connectivity manager as described with reference to FIGS. 9 through 12.

At 1610, the base station may receive an indication of whether MDT measurements are supported by the UE for the non-standalone base station. The operations of 1610 may be performed according to the methods described herein. In some examples, aspects of the operations of 1610 may be performed by an MDT non-standalone manager as described with reference to FIGS. 9 through 12.

At 1615, the base station may receive the MDT measurements based on whether the MDT measurements are supported by the UE for the non-standalone base station. The operations of 1615 may be performed according to the methods described herein. In some examples, aspects of the operations of 1615 may be performed by an MDT measurement report manager as described with reference to FIGS. 9 through 12.

Figure 17:
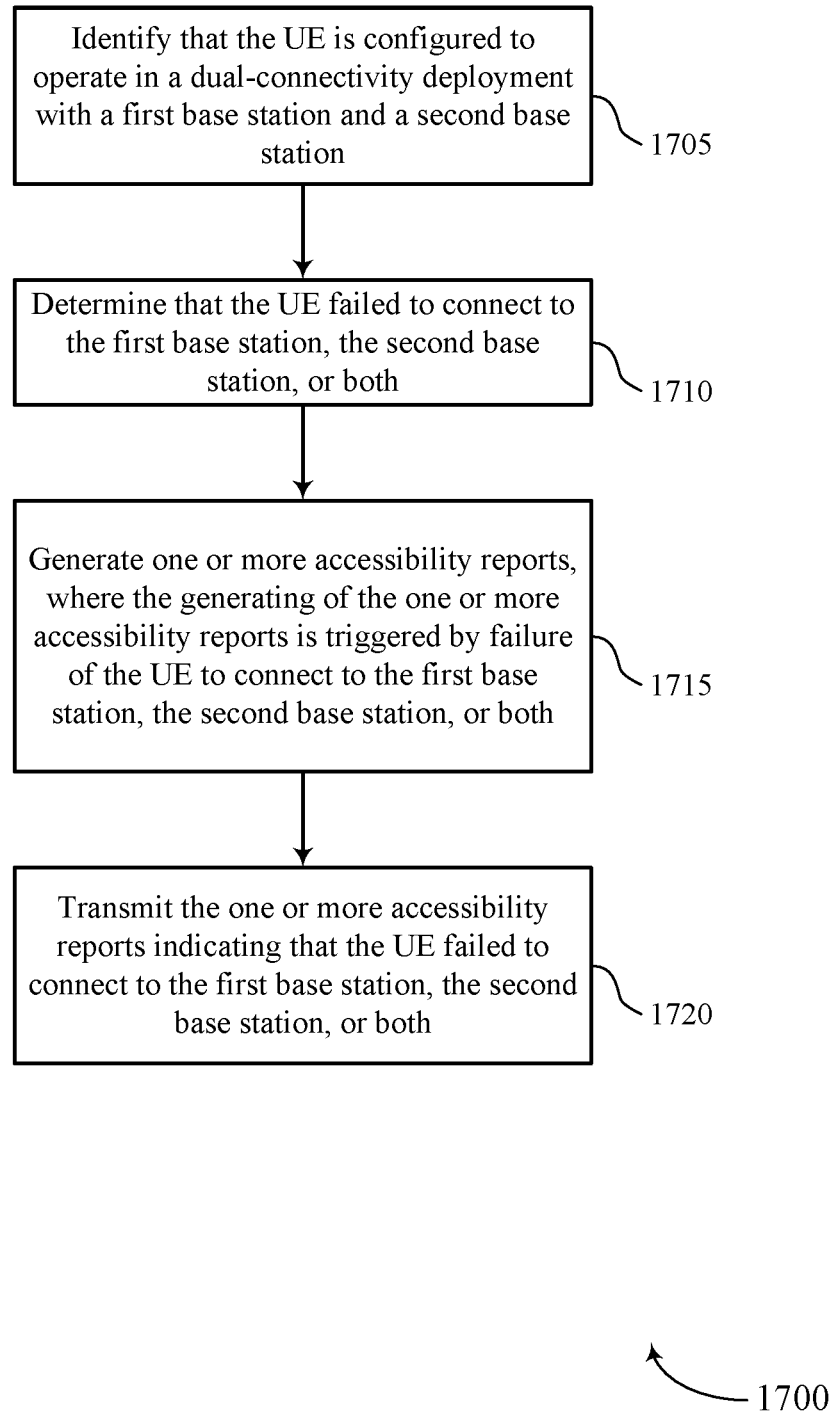

FIG. 17 shows a flowchart illustrating a method 1700 that supports MDT for multi-RAT dual connectivity in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1705, the UE may identify that the UE is configured to operate in a dual-connectivity deployment with a first base station and a second base station. The operations of 1705 may be performed according to the methods described herein. In some examples, aspects of the operations of 1705 may be performed by a dual-connectivity manager as described with reference to FIGS. 5 through 8.

At 1710, the UE may determine that the UE failed to connect to the first base station, the second base station, or both. The operations of 1710 may be performed according to the methods described herein. In some examples, aspects of the operations of 1710 may be performed by a connection manager as described with reference to FIGS. 5 through 8.

At 1715, the UE may generate one or more accessibility reports, where the generating of the one or more accessibility reports is triggered by failure of the UE to connect to the first base station, the second base station, or both. The operations of 1715 may be performed according to the methods described herein. In some examples, aspects of the operations of 1715 may be performed by an MDT accessibility report manager as described with reference to FIGS. 5 through 8.

At 1720, the UE may transmit the one or more accessibility reports indicating that the UE failed to connect to the first base station, the second base station, or both. The operations of 1720 may be performed according to the methods described herein. In some examples, aspects of the operations of 1720 may be performed by an MDT accessibility report manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

EXAMPLE 1

A method for wireless communication at a UE, comprising: receiving a measurement configuration for collecting and reporting MDT measurements; identifying one or more fields in the measurement configuration that indicate at least one of a RAT type for collecting the MDT measurements and a RAT type for reporting the MDT measurements; collecting the MDT measurements in accordance with the one or more fields within the measurement configuration; and transmitting one or more reports including information indicative of the MDT measurements in accordance with the one or more fields within the measurement configuration.

EXAMPLE 2

The method of example 1, further comprising: determining that the one or more fields within the measurement configuration indicate a common RAT type for collecting or reporting the MDT measurements, wherein the common RAT type includes measurement configurations for multiple RAT types.

EXAMPLE 3

The method of any of example 1, further comprising: determining that the one or more fields within the measurement configuration indicate a specific RAT type for collecting or reporting the MDT measurements.

EXAMPLE 4

The method of any of examples 1 to 3, further comprising: identifying that the UE is operating in a dual-connectivity deployment with a first base station associated with a first RAT and a second base station associated with a second RAT; determining that the one or more fields within the measurement configuration indicate a common RAT type for collecting or reporting the MDT measurements, wherein the common RAT type indicates that the measurement configuration is to be used for collecting or reporting measurements for the first RAT and the second RAT; and collecting and reporting MDT measurements for the first RAT and the second RAT based at least in part on the measurement configuration.

EXAMPLE 5

The method of example 4, wherein the first base station is a master node and the second base station is a secondary node.

EXAMPLE 6

The method of any of examples 4 or 5, wherein the first RAT or the second RAT comprises NR, LTE, LTE-LAA, or NR-U.

EXAMPLE 7

The method of any of examples 1 to 6, further comprising: identifying an indication in the measurement configuration of whether the measurement configuration applies when the UE is configured to operate in a dual-connectivity mode, wherein transmitting the one or more reports comprises:

indicating, in the one or more reports, whether the MDT measurements were collected in the dual-connectivity mode.

EXAMPLE 8

The method of any of examples 1 to 7, wherein collecting the MDT measurements in accordance with the one or more fields within the measurement configuration comprises: collecting a first set of MDT measurements for a first RAT, or a second set of MDT measurements for a second RAT, or both based at least in part on the one or more fields within the measurement configuration.

EXAMPLE 9

The method of any of examples 1 to 8, further comprising: connecting to a base station associated with a first RAT; and transmitting a report including MDT measurements associated with a second RAT to the base station associated with the first RAT.

EXAMPE 10

A method for wireless communication at a base station, comprising: identifying at least one of a RAT type for a UE to use to collect MDT measurements and a RAT type for the UE to use to report the MDT measurements; generating a measurement configuration including one or Mire fields that indicate the at least one of a RAT type for collecting the MDT measurements and the RAT type for reporting the MDT measurements; transmitting the measurement configuration; and receiving one or more reports including information indicative of the MDT measurements in accordance with the measurement configuration.

EXAMPLE 11

The method of example 10, wherein the identifying comprises: identifying a common RAT type for the UE to use to collect or report the MDT measurements, wherein the common RAT type includes measurement configurations for multiple RAT types.

EXAMPLE 12

The method of any of example 10, wherein the identifying comprises: identifying a specific RAT type for the UE to use to collect or report the MDT measurements.

EXAMPLE 13

The method of any of examples 10 to 12, wherein the base station is associated with a first RAT, and wherein receiving the one or more reports including information indicative of the MDT measurements comprises: receiving a report including MDT measurements associated with a second RAT.

EXAMPLE 14

A method for wireless communication at a UE, comprising: identifying that the UE is operating in a dual-connectivity deployment with a first base station and a second base station, wherein the second base station comprises a non-standalone base station; transmitting an indication of whether MDT measurements are supported by the UE for the non-standalone base station; and collecting and reporting MDT measurements based at least in part on whether MDT measurements are supported by the UE for the non-standalone base station.

EXAMPLE 15

The method of example 14, wherein the indication comprises a first indication, the method further comprising: transmitting, to the first base station, the first indication of whether MDT measurements are supported by the UE for the non-standalone base station; and transmitting, to the first base station, a second indication of whether MDT measurements are supported by the UE for the first base station.

EXAMPLE 16

The method of example 15, wherein collecting and reporting MDT measurements comprises: collecting MDT measurements for the non-standalone base station; and reporting the MDT measurements to the first base station.

EXAMPLE 17

The methods of any of examples 15 or 16, wherein the first indication and the second indication are transmitted in a two-bit MDT availability indication.

EXAMPLE 18

The methods of any of examples 15 to 17, wherein the first indication and the second indication are transmitted separately.

EXAMPLE 19

The methods of any of examples 14 to 18, wherein transmitting the indication comprises: transmitting, in a transparent container to the first base station, the indication of whether MDT measurements are supported by the UE for the non-standalone base station.

EXAMPLE 20

The method of example 19, wherein collecting and reporting MDT measurements comprises: collecting MDT measurements for the non-standalone base station; and reporting the MDT measurements to the first base station.

EXAMPLE 21

The method of any of examples 14 to 20, wherein transmitting the indication comprises: transmitting, to a standalone base station associated with a same RAT as the non-standalone base station, the indication of whether MDT measurements are supported by the UE for the non-standalone base station.

EXAMPLE 22

The method of example 21, wherein collecting and reporting MDT measurements comprises: collecting MDT measurements for the non-standalone base station; and reporting the MDT measurements to the standalone base station.

EXAMPLE 23

The methods of any of examples 14 to 22, further comprising: receiving a measurement configuration for collecting and reporting MDT measurements, the measurement configuration indicating a RAT type with a restriction to non-standalone base stations, standalone base stations, or both; and collecting and reporting MDT measurements for the RAT type based at least in part, on the restriction.

EXAMPLE 24

A method for wireless communication at a UE, comprising: identifying that the UE is configured to operate in a dual-connectivity deployment with a first base station and a second base station; determining that the UE failed to connect to the first base station, the second base station, or both; generating one or more accessibility reports, wherein the generating of the one or more accessibility reports is triggered by failure of the UE to connect to the first base station, the second base station, or both; and transmitting the one or more accessibility reports indicating that the UE failed to connect to the first base station, the second base station, or both.

EXAMPLE 25

The method of example 24, wherein determining that the UE failed to connect to the first base station, the second base station, or both comprises: attempting to gain access to the first base station or the second base station via a random-access procedure; and determining that the random-access procedure failed.

EXAMPLE 26

The methods of examples 24 or 25, wherein transmitting one or more accessibility reports comprises: transmitting, to the first base station, a first accessibility report indicating that the UE failed to connect to the first base station; and transmitting, to the second base station, a second accessibility report indicating that the UE failed to connect to the second base station.

EXAMPLE 27

The method of example 26, wherein the first accessibility report is transmitted in an SRB 1, and the second accessibility report is transmitted in an SRB 3.

EXAMPLE 28

The methods of any of examples 24 to 27, wherein transmitting one or more accessibility reports comprises: transmitting, to the first base station, an accessibility report indicating that the UE failed to connect to the first base station or that the UE failed to connect to the second base station.

EXAMPLE 29

The method of example 28, wherein the accessibility report is transmitted in an SRB 1.

EXAMPLE 30

The methods of any of examples 24 to 29, further comprising: storing a time stamp of elapsed time between logging a failed connection to the first base station or the second base station and reporting a log, a global cell identity of the first base station or the second base station, an indication of latest available radio measurements for any frequency or RAT, an indication of latest detailed location information, a number of random access preambles transmitted, an indication of whether a maximum transmission power was used, an indication of a number of attempted beams, an indication of whether contention was detected, an indication of latest wireless local area network measurement results, an indication of latest Bluetooth measurement results, or a combination thereof.

EXAMPLE 31

An apparatus for wireless communications comprising a processor; memory in electronic communication with the processor; and instructions stored in the memory and executable by the processor to cause the apparatus to perform a method of any of examples 1 to 9.

EXAMPLE 32

A non-transitory computer-readable medium storing code for wireless communications, the code comprising instructions executable by a processor to perform a method of any of examples 1 to 9.

EXAMPLE 33

An apparatus, comprising means for performing the method of any of examples 1 to 9.

EXAMPLE 34

An apparatus for wireless communications comprising a processor; memory in electronic communication with the processor; and instructions stored in the memory and executable by the processor to cause the apparatus to perform a method of any of examples 10 to 13.

EXAMPLE 35

A non-transitory computer-readable medium storing code for wireless communications, the code comprising instructions executable by a processor to perform a method of any of examples 10 to 13.

EXAMPLE 36

An apparatus, comprising means for performing the method of any of examples 10 to 13.

EXAMPLE 37

An apparatus for wireless communications comprising a processor; memory in electronic communication with the processor; and instructions stored in the memory and executable by the processor to cause the apparatus to perform a method of any of examples 14 to 23.

EXAMPLE 38

A non-transitory computer-readable medium storing code for wireless communications, the code comprising instructions executable by a processor to perform a method of any of examples 14 to 23.

EXAMPLE 39

An apparatus, comprising means for performing the method of any of examples 14 to 23.

EXAMPLE 40

An apparatus for wireless communications comprising a processor; memory in electronic communication with the processor; and instructions stored in the memory and executable by the processor to cause the apparatus to perform a method of any of examples 24 to 30.

EXAMPLE 41

A non-transitory computer-readable medium storing code for wireless communications, the code comprising instructions executable by a processor to perform a method of any of examples 24 to 30.

EXAMPLE 42

An apparatus, comprising means for performing the method of any of examples 24 to 30.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (IIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UIRA), institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). UE, UE-A, and UE-A Pro are releases of UNITS that use E-UTRA. UTRA, E-UTRA, UMTS, LTE. UE-A, UE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, UE-A Pro, or NR system may be described for purposes of example, and UE, UE-A, UE-A Pro, or NR terminology may be used in much of the description, the techniques described herein are applicable beyond LTE, UE-A, UE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. Fax example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a first network entity associated with a second radio access technology type, a measurement configuration for collecting and reporting minimization of drive test measurements;
   identifying, based at least in part on receiving the measurement configuration, first information indicative of a first radio access technology type for collecting the minimization of drive test measurements and the second radio access technology type for reporting the minimization of drive test measurements, wherein the second radio access technology type is different than the first radio access technology type;
   collecting the minimization of drive test measurements in accordance with the first information; and
   transmitting, to a second network entity associated with the second radio access technology type, one or more reports including second information indicative of the minimization of drive test measurements in accordance with the first information.

2. The method of claim 1, further comprising:
   determining that the first information indicates a common radio access technology type for collecting or reporting the minimization of drive test measurements, wherein the common radio access technology type indicates that the measurement configuration is applicable to multiple radio access technology types.

3. The method of claim 1, further comprising:
   determining that the first information indicates a specific radio access technology type for collecting or reporting the minimization of drive test measurements.

4. The method of claim 1, further comprising:
   identifying that the UE is operating in a dual-connectivity deployment with the first network entity associated with the second radio access technology type and a third network entity associated with the first radio access technology type;
   determining that the first information indicates a common radio access technology type for collecting or reporting the minimization of drive test measurements, wherein the common radio access technology type indicates that the measurement configuration is applicable to collecting or reporting measurements for the first radio access technology type and the second radio access technology type; and
   collecting and reporting minimization of drive test measurements for the first radio access technology type and the second radio access technology type based at least in part on the measurement configuration.

5. The method of claim 4, wherein the first network entity is a master node and the third network entity is a secondary node.

6. The method of claim 4, wherein the first radio access technology type or the second radio access technology type comprises New Radio, Long Term Evolution, Long Term Evolution licensed assisted access, Wi-Fi, or New Radio unlicensed.

7. The method of claim 1, further comprising:
   identifying an indication in the measurement configuration of whether the measurement configuration applies when the UE is configured to operate in a dual-connectivity mode, wherein transmitting the one or more reports comprises:

indicating, in the one or more reports, whether the minimization of drive test measurements were collected in the dual-connectivity mode.

8. The method of claim 1, wherein collecting the minimization of drive test measurements in accordance with the first information comprises:
collecting a first set of minimization of drive test measurements for the first radio access technology type, or a second set of minimization of drive test measurements for the second radio access technology type, or both based at least in part on the first information.

9. The method of claim 1, further comprising:
connecting to a third network entity associated with the first radio access technology type; and
transmitting a report including minimization of drive test measurements associated with the second radio access technology type to the third network entity associated with the first radio access technology type.

10. The method of claim 1, wherein the one or more reports are transmitted via a radio resource control connection between the UE and the second network entity.

11. A method for wireless communication at a network entity, comprising:
identifying a first radio access technology type for a user equipment (UE) to use to collect minimization of drive test measurements and a second radio access technology type for the UE to use to report the minimization of drive test measurements, wherein the second radio access technology type is different than the first radio access technology type;
generating a measurement configuration including first information indicative of the first radio access technology type for collecting the minimization of drive test measurements and the second radio access technology type for reporting the minimization of drive test measurements;
transmitting the measurement configuration; and
receiving one or more reports including second information indicative of the minimization of drive test measurements in accordance with the measurement configuration, wherein the network entity is associated with the second radio access technology type.

12. The method of claim 11, wherein the identifying comprises:
identifying a common radio access technology type for the UE to use to collect or report the minimization of drive test measurements, wherein the common radio access technology type indicates that the measurement configuration is applicable to multiple radio access technology types.

13. The method of claim 11, wherein the identifying comprises:
identifying a specific radio access technology type for the UE to use to collect or report the minimization of drive test measurements.

14. The method of claim 11, wherein receiving the one or more reports including second information indicative of the minimization of drive test measurements comprises:
receiving a report including minimization of drive test measurements associated with the first radio access technology type.

15. The method of claim 11, wherein the one or more reports are received via a radio resource control connection between the UE and the network entity.

16. A method for wireless communication at a user equipment (UE), comprising:
identifying that the UE is operating in a dual-connectivity deployment with a first network entity and a second network entity, wherein the second network entity comprises a non-standalone network entity associated with a same radio access technology type as the first network entity;
transmitting an indication of whether minimization of drive test measurements are supported by the UE for the non-standalone network entity that is associated with the same radio access technology type as the first network entity; and
collecting minimization of drive test measurements for the non-standalone network entity and reporting the minimization of drive test measurements to the first network entity based at least in part on whether minimization of drive test measurements are supported by the UE for the non-standalone network entity.

17. The method of claim 16, wherein the indication comprises a first indication, the method further comprising:
transmitting, to the first network entity, the first indication of whether minimization of drive test measurements are supported by the UE for the non-standalone network entity; and
transmitting, to the first network entity, a second indication of whether minimization of drive test measurements are supported by the UE for the first network entity.

18. The method of claim 17, wherein the first indication and the second indication are transmitted in a two-bit minimization of drive test availability indication.

19. The method of claim 17, wherein the first indication and the second indication are transmitted separately.

20. The method of claim 16, wherein transmitting the indication comprises:
transmitting, in a transparent container to the first network entity, the indication of whether minimization of drive test measurements are supported by the UE for the non-standalone network entity.

21. The method of claim 16, wherein transmitting the indication comprises:
transmitting, to a standalone network entity associated with the same radio access technology type as the non-standalone network entity, the indication of whether minimization of drive test measurements are supported by the UE for the non-standalone network entity.

22. The method of claim 21, wherein collecting and reporting minimization of drive test measurements comprises:
collecting minimization of drive test measurements for the non-standalone network entity; and
reporting the minimization of drive test measurements to the standalone network entity.

23. The method of claim 16, further comprising:
receiving a measurement configuration for collecting and reporting minimization of drive test measurements, the measurement configuration indicating a radio access technology type with a restriction to non-standalone network entities, standalone entities, or both; and
collecting and reporting minimization of drive test measurements for the radio access technology type based at least in part on the restriction.

* * * * *